(12) United States Patent
Kawai et al.

(10) Patent No.: US 9,047,680 B2
(45) Date of Patent: Jun. 2, 2015

(54) INFORMATION PROCESSING APPARATUS, INFORMATION PROCESSING METHOD, AND DATA STRUCTURE OF CONTENT FILES

(75) Inventors: Aritoki Kawai, Tokyo (JP); Takashi Nozaki, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 340 days.

(21) Appl. No.: 13/391,160

(22) PCT Filed: Jun. 8, 2010

(86) PCT No.: PCT/JP2010/003799
§ 371 (c)(1),
(2), (4) Date: Apr. 27, 2012

(87) PCT Pub. No.: WO2011/030484
PCT Pub. Date: Mar. 17, 2011

(65) Prior Publication Data
US 2012/0206491 A1 Aug. 16, 2012

(30) Foreign Application Priority Data

Sep. 11, 2009 (JP) .................................. 2009-210107

(51) Int. Cl.
*G06G 5/00* (2006.01)
*G06T 3/40* (2006.01)
(Continued)

(52) U.S. Cl.
CPC ................ *G06T 3/40* (2013.01); *G06F 3/0482* (2013.01); *G06F 3/04815* (2013.01); *G06T 11/001* (2013.01)

(58) Field of Classification Search
CPC combination set(s) only.
See application file for complete search history.

(56) References Cited

U.S. PATENT DOCUMENTS 6,400,362 B1 * 6/2002 Uchiyama et al. ............ 345/420
6,563,999 B1    5/2003 Suzuoki
(Continued)

FOREIGN PATENT DOCUMENTS

JP 2000048039 A 2/2000
JP 2000235385 A 8/2000
(Continued)

OTHER PUBLICATIONS

International Search Report for the corresponding PCT Application No. PCT/JP2010/003799, dated Sep. 28, 2010.
(Continued)

*Primary Examiner* — David Zarka
*Assistant Examiner* — Terrell Robinson
(74) *Attorney, Agent, or Firm* — Matthew B. Demier, Esq.; Gibson & Dernier LLP

(57) ABSTRACT

As a user inputs instruction to start up content, an initial image is displayed. A viewpoint shift request is made, viewpoint coordinates are calculated according to the viewpoint shift request. Then verified is whether a hierarchical level has been changed in hierarchical image data due to a shift of the viewpoint coordinates or not. If the hierarchical level has been changed, the node of a hierarchical image is extracted from image correspondence data and then a coordinate transform matrix associated with the node is modified. A new elemental image is decoded, each image is subjected to the coordinate transform based on the image correspondence data so as to evaluate the coordinates on display coordinates. Each elemental image is placed on the evaluated coordinates, which in turn integrates the elemental images and updates a displayed imaged.

17 Claims, 15 Drawing Sheets

(51) Int. Cl.
    *G06F 3/0482*    (2013.01)
    *G06F 3/0481*    (2013.01)
    *G06T 11/00*    (2006.01)

(56) References Cited

U.S. PATENT DOCUMENTS

| | | | | |
|---|---|---|---|---|
| 2002/0033837 A1* | 3/2002 | Munro | ........................... | 345/654 |
| 2002/0135596 A1* | 9/2002 | Yamamoto | ..................... | 345/589 |
| 2003/0113037 A1* | 6/2003 | Yoda | .............................. | 382/302 |
| 2005/0183797 A1* | 8/2005 | Ray | ................................ | 148/556 |
| 2006/0026424 A1* | 2/2006 | Eto | ................................. | 713/165 |
| 2006/0256130 A1* | 11/2006 | Gonzalez | ...................... | 345/619 |
| 2007/0253627 A1* | 11/2007 | Islam | ............................. | 382/232 |
| 2007/0260137 A1* | 11/2007 | Sato et al. | .................... | 600/407 |
| 2008/0062141 A1* | 3/2008 | Chandhri | ...................... | 345/173 |
| 2008/0144107 A1* | 6/2008 | Lieb | ............................... | 358/1.18 |
| 2008/0309669 A1* | 12/2008 | Choi et al. | .................... | 345/427 |

FOREIGN PATENT DOCUMENTS

| | | | |
|---|---|---|---|
| JP | 2001082965 A | | 3/2001 |
| JP | 2008257555 A | | 10/2008 |

OTHER PUBLICATIONS

International Preliminary Report on Patentability and Written Opinion for the corresponding PCT Application No. PCT/JP2010/003799, dated Apr. 11, 2012.

Sylvain Lefebvre, et. al., Unified Texture Management for Arbitrary Meshes, Rapport de recherche, No. 5210, Institut National De Recherche En Informatique Et En Automatique, pp. 1-20, (May 2004).

Martin Kraus, et. al., Adaptive Texture Maps, Graphics Hardware, The Eurographics Association, pp. 1-10, (2002).

* cited by examiner

220

230

INFORMATION PROCESSING APPARATUS, INFORMATION PROCESSING METHOD, AND DATA STRUCTURE OF CONTENT FILES

TECHNICAL FIELD

The present invention relates to an image processing technology for enlarging/reducing or shifting vertically and horizontally images shown on a display.

BACKGROUND ART

There are proposed home entertainment systems capable of not only executing game programs but also playing the video. In these home entertainment systems, a GPU generates three-dimensional images using polygons (see Patent Document 1, for instance).

How efficiently images are displayed is always an important problem whatever the purpose of the image display is. Various contrivances have been called for to render high-definition images in particular at high speed, and a technique for efficiently performing a mapping while holding the texture data separately has been proposed, for instance (see Non-patent Documents 1 and 2, for instance).

RELATED ART DOCUMENTS

Patent Documents

[Patent Document 1] U.S. Pat. No. 6,563,999.

Non-Patent Documents

[Non-patent Document 1] Sylvain Lefebvre, et. al., Unified Texture Management for Arbitrary Meshes, Rapport de recherche, No. 5210, May 2004, Institut National De Recherche En Informatique Et En Automatique.
[Non-patent Document 2] Martin Kraus, et. al., Adaptive Texture Maps, Graphics Hardware (2002), pp. 1-10, The Eurographics Association.

The higher the desired definition and complexity of images to be displayed are, the more trouble and time it will take to prepare the data. Hence, there always exists a requirement for efficient and easy preparation of content including such images. Also, in aspects where images are to be altered by the operation of a user or according to predetermined settings, it is desired that complex movements can be rendered with high efficiency and speed.

SUMMARY OF THE INVENTION

The present invention has been made in view of these problems, and a purpose thereof is to provide a technology for easily preparing content including image display and displaying images by efficiently processing such content.

Means to Solve the Problem

One embodiment of the present invention relates to an information processing apparatus. This information processing apparatus is an information processing apparatus for processing content displaying an image constituted by elemental images with varying a display area and an enlargement factor of the displayed image, the elemental images including a hierarchical images having a data structure where pieces of image data with different resolutions generated from a single image is hierarchized in the order of resolution, and the information processing apparatus includes: a viewpoint coordinate acquiring unit configured to receive a request for a shift of a viewpoint for the displayed image and configured to acquire viewpoint coordinates of an image to be displayed next; an elemental image rendering unit configured to render the elemental image; and a coordinate conversion unit configured to convert a coordinate system unique to each elemental image into a display coordinate system, based on image correspondence data where a layout of the elemental image is expressed by a relative position in relation to another elemental image, and configured to calculate positional coordinates in the display coordinate system of each elemental image corresponding to the viewpoint coordinates of the image to be displayed next; and an elemental image integrating unit configured to generate a displayed image where the elemental image rendered by the elemental image rendering unit is arranged in the respective positional coordinates.

Another embodiment of the present invention relates also to an information processing apparatus. This information processing apparatus is an information processing apparatus for supporting the preparation of content displaying an image constituted by elemental images with varying a display area and an enlargement factor of the displayed image, the elemental images including a hierarchical images having a data structure where pieces of image data with different resolutions generated from a single image is hierarchized in the order of resolution, and the information processing apparatus includes: an input information acquiring unit configured to receive, from a user, elemental image data on the elemental images, a layout of each elemental image, and a specification of an elemental image that moves in conjunction with another elemental image as a result of a shift of a viewpoint when displayed; an image correspondence data generator configured to generate image correspondence data where the elemental image data is associated with relative positional information expressing the layout of each elemental image by a relative position of another elemental image linked to the each elemental image; and a content file generator configured to generate a content file data where the elemental image data and the image correspondence data are associated with each other.

Still another embodiment of the present invention relates to an information processing method. This information processing method is an information processing method for processing content displaying an image constituted by elemental images with varying a display area and an enlargement factor of the displayed image, the elemental images including a hierarchical images having a data structure where pieces of image data with different resolutions generated from a single image is hierarchized in the order of resolution, and the method includes: receiving a request for a shift of a viewpoint for the displayed image and acquiring viewpoint coordinates of an image to be displayed next; reading, from a memory, data of the elemental images and rendering the elemental image; and reading, from the memory, image correspondence data where a layout of the elemental image is expressed by a relative position in relation to another elemental image and converting a coordinate system unique to each elemental image into a display coordinate system, based on the image correspondence data, and calculating positional coordinates in the display coordinate system of each elemental image corresponding to the viewpoint coordinates of the image to be displayed next; and generating a displayed image where the elemental image rendered is arranged in the positional coordinates, and displaying the displayed image on a display apparatus.

Still another embodiment of the present invention relates also to an information processing method. This information processing method is an information processing method for supporting the preparation of content displaying an image constituted by elemental images with varying a display area and an enlargement factor of the displayed image, the elemental images including a hierarchical images having a data structure where pieces of image data with different resolutions generated from a single image is hierarchized in the order of resolution, and the method includes: receiving, from a user, elemental image data on the elemental images, a layout of each elemental image, and a designation of an elemental image that moves in conjunction with another elemental image as a result of a shift of a viewpoint when displayed; generating image correspondence data where the elemental image data is associated with relative positional information expressing the layout of each elemental image by a relative position of another elemental image linked to each elemental image, and storing the image correspondence data in a memory; and generating content file data where the elemental image data and the image correspondence data are associated with each other, and storing the content file in the memory.

Still another embodiment of the present invention relates to a data structure of a content file. The data structure of a ficil content displaying an image constituted by elemental images with varying a display area and an enlargement factor of the displayed image, the elemental images including a hierarchical images having a data structure where pieces of image data with different resolutions generated from a single image is hierarchized in the order of resolution, wherein the data structure of the content file associates data on the elemental images with image correspondence data where a layout of each elemental image at the time of displaying is expressed by a coordinate transform matrix by which a coordinate system unique to the elemental image is converted into that which is unique to another elemental image.

Optional combinations of the aforementioned constituting elements, and implementations of the invention in the form of methods, apparatuses, systems, computer programs, and so forth may also be effective as additional modes of the present invention.

The present invention easily prepares content including complex image display and efficiently displays images.

DETAILED DESCRIPTION OF THE INVENTION

A content to be generated and processed in the present embodiment involves an output of image data having a hierarchical structure which is constituted by images of different resolutions generated by reducing an original image in a plurality of stages. An image at each hierarchical level is divided into one or more tile images. For example, an image of the lowest resolution is made up of a single tile image, whereas an image of the highest resolution is made up of a highest number of tile images. During image display, an enlarged display or a reduced display is effected with speed by switching the tile image being used in the rendering to the tile image of a different hierarchical level when the displayed image reaches a predetermined enlargement factor.

Figure 1:
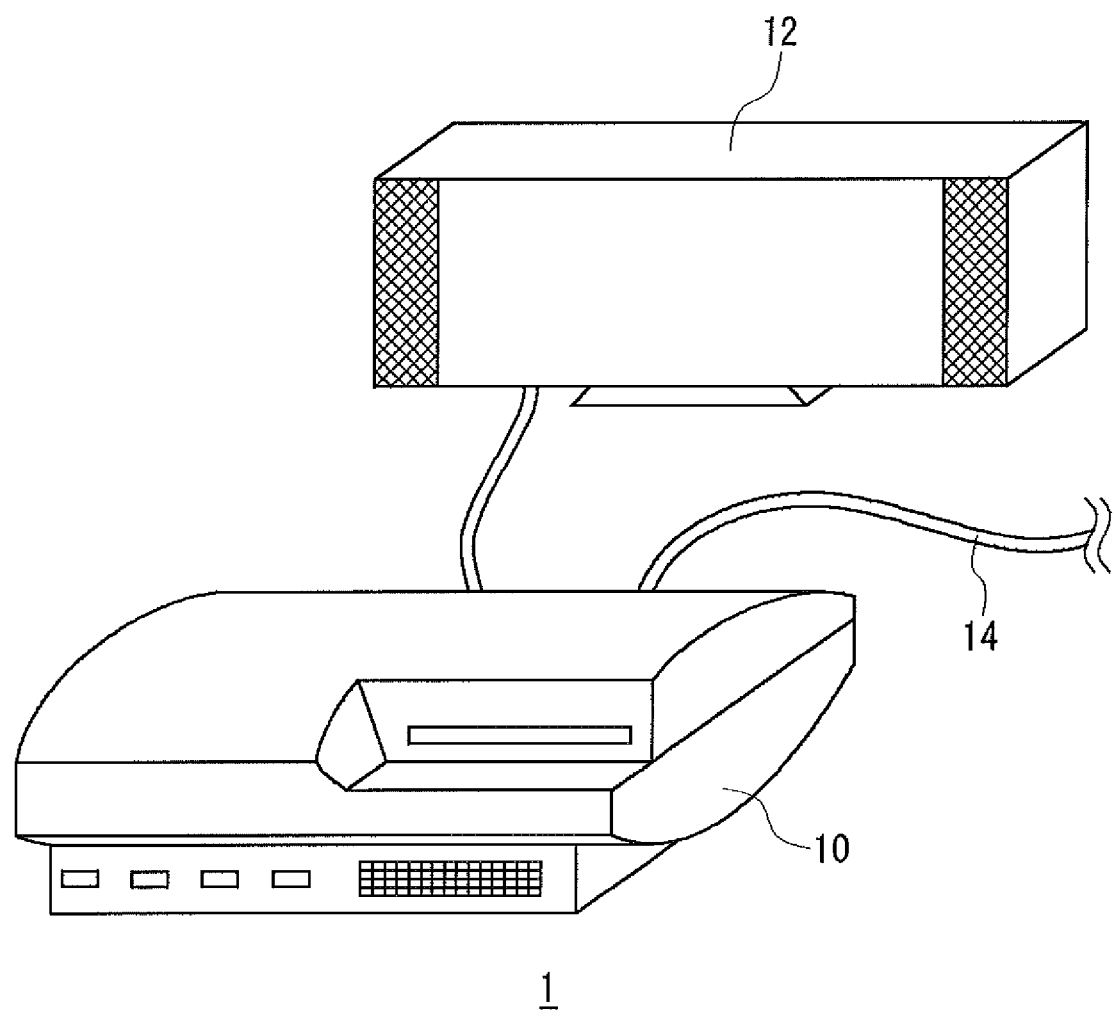
FIG. 1 illustrates a usage environment of an information processing system to which an present embodiment is applicable.

Firstly, a description will be given of a basic display mode for images having a hierarchical structure as described above. FIG. 1 illustrates a usage environment of an information processing system 1 to which the present embodiment is applicable. The information processing system 1 includes an information processing apparatus 10 for processing contents and a display device 12 for outputting the results of processing by the information processing apparatus 10. The display device 12 may be a television set which has a display for outputting images and a speaker for outputting sounds. The display device 12 may be connected to the information processing apparatus 10 by a cable or connected wirelessly thereto by a wireless LAN (Local Area Network).

In the information processing system 1, the information processing apparatus 10 may be connected to an external network such as the Internet via a cable 14 and thereby acquire the contents and the displayed data by downloading them. Note that the information processing apparatus 10 may be wirelessly connected to the external network. The information processing apparatus 10 may be a game device or personal computer, for instance.

The information processing apparatus 10 performs such processings as changing the image data shown on the display of the display device 12, and changing the display regions by enlarging/reducing the images, or moving or shifting the images vertically and horizontally, upon request from a user. When there is any change in the image to be displayed due to a selection of an image to be displayed by the user or along the progress of the game, the information processing unit 10 identifies the image to be displayed afresh and performs a loading and decoding of the identified data. Also, when the user operates an input device while watching the images shown on the display, the display regions can be changed reflecting the commands of request signals as the input device transmits the display region changing request signals to the information processing unit 10.

Figure 2:
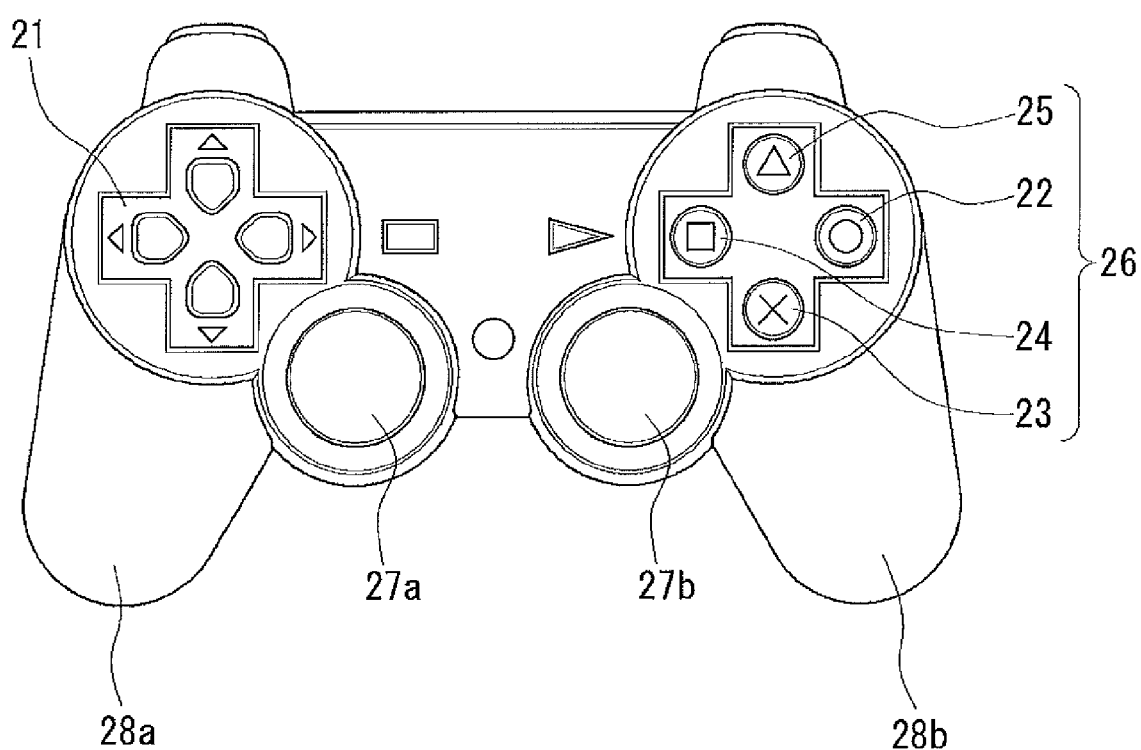
FIG. 2 shows an example of an external structure of an input device which is applicable to the information processing system of FIG. 1.

FIG. 2 shows an example of an external structure of an input device 20. As operating means operable by the user, the input device 20 includes a directional key 21, analog sticks 27a and 27b, and four kinds of operation buttons 26. The four kinds of operation buttons 26 are a circle-marked button 22, an x-marked button 23, a square-marked button 24, and a triangle-marked button 25.

In the information processing system 1, the operating means of the input device 20 is assigned to perform the functions of inputting requests for enlarging/reducing the displayed image and requests for vertical and horizontal scrolls. For example, the input function of an enlargement/reduction request of the displayed image is assigned to the right-hand analog stick 27b. The user can input a request for reduction of the displayed image by pulling the analog stick 27b toward himself/herself and a request for enlargement of the displayed image by pushing it away. Also, the input function of requests for shifting the display region is assigned to the directional key 21. The user can press down the directional key 21 and input a request for shifting the display region in the direction toward which the directional key 21 is pressed down.

It is to be noted, however, that the input function of image changing requests may be assigned to another operating means. For example, the input function of scroll requests may be assigned to the analog stick 27a. Further, where a menu, instruction buttons or the like are displayed on a screen depending on the detail of content, the arrangement may be such that the input function of requests for shifting the cursor on the screen is assigned to the directional key 21, and the decision input function is assigned to the circle-marked button 22.

The input device 20, having the function of transmitting various inputted request signals to the information processing apparatus 10, is so structured as to be able to wirelessly communicate with the information processing apparatus 10 in this embodiment. The input device 20 and the information processing apparatus 10 may establish wireless connection with each other using the Bluetooth (registered trademark) protocol, the IEEE802.11 protocol, or the like. Also, the input device 20 may transmit the request signals to the information processing apparatus 10 through a cable connection therewith.

Figure 3:
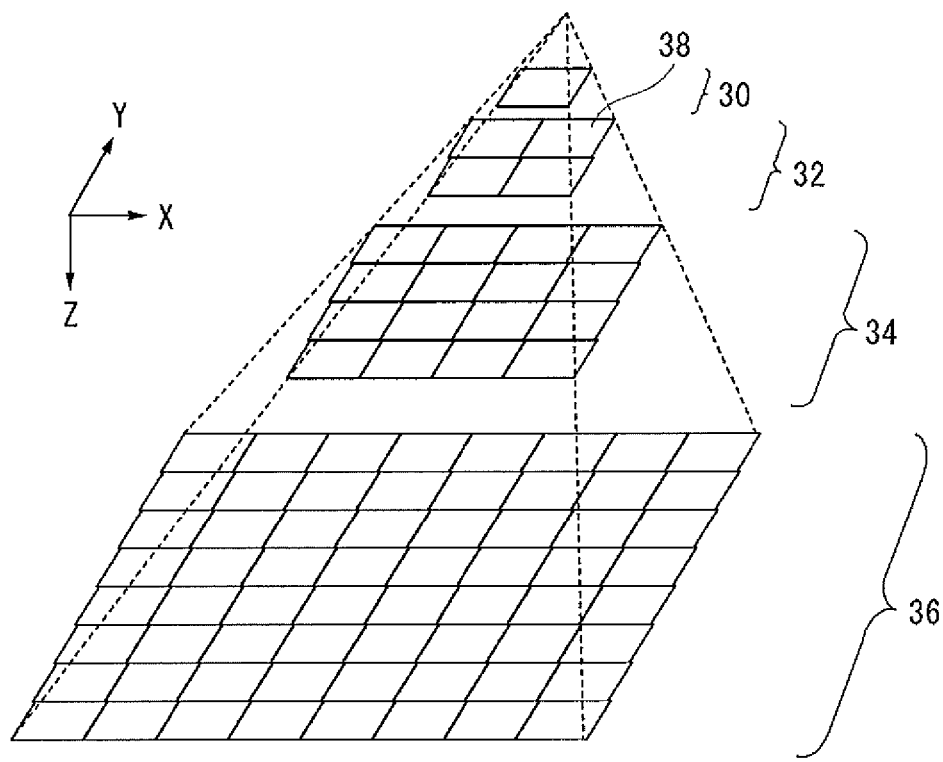
FIG. 3 shows a hierarchical structure of image data used in an embodiment.

FIG. 3 shows a hierarchical structure of image data that is used in the present embodiment. The image data has a hierarchical structure comprised of 0th hierarchical level 30, 1st hierarchical level 32, 2nd hierarchical level 34, and 3rd hierarchical level 36 in a depth (Z axis) direction. Note that while only four hierarchical levels are shown in FIG. 3, the number of hierarchical levels is not limited thereto. Hereinafter, image data having a hierarchical structure like this is referred to as "hierarchical image data", and images displayed using such data are referred to as "hierarchical image".

The hierarchical image data shown in FIG. 3 has a quadtree hierarchical structure, and the hierarchical levels have each one or more tile images 38. All the tile images 38 are formed in the same size having the same number of pixels, for example, 256×256 pixels. The image data at each hierarchical level represents a single image at different resolution, and the image data at the 2nd hierarchical level 34, 1st hierarchical level 32, and 0th hierarchical level 30 are generated by reducing an original image of the 3rd hierarchical level 36 having the highest resolution in a plurality of stages. For example, the resolution of the Nth hierarchical level (N being an integer greater than or equal to 0) may be ½ of the resolution of the (N+1)th hierarchical level in both the horizontal (X axis) and vertical (Y axis) directions.

The hierarchical image data, compressed in a preselected compression format, are stored in a recording medium or a storage device in the form of content file together with other data that are needed for content processing. And they are read out from the recording medium or storage device at the start or during the processing of content at the information processing apparatus 10, and decoded. The information processing apparatus 10 according to the present embodiment has decoding functions compatible with multiple kinds of compression formats and is therefore capable of decoding compressed data in the S3TC format, the JPEG format, and the JPEG2000 format, for instance. The compression of hierarchical image data may be performed in units of a tile image or in units of a plurality of tile images included in a single hierarchical level or a plurality of hierarchical levels.

The hierarchical structure of the hierarchical image data, as shown in FIG. 3, forms a virtual three-dimensional space with the horizontal direction set on the X axis, the vertical direction set on the Y axis, and the depth direction set on the Z axis. The information processing apparatus 10 first derives the amount of viewpoint shift from a viewpoint shift request signal for enlargement/reduction or display region shift and then derives the coordinates of the four corners of a frame (frame coordinates) in a virtual space using the amount of shift. The frame coordinates in the virtual space are used in loading compressed data into a main memory and in generating images to be displayed, to be discussed later. Note that the information processing apparatus 10 may derive information identifying a desired hierarchical level and the texture coordinates (UV coordinates) of the hierarchical level instead of the frame coordinates in the virtual space.

Figure 4:
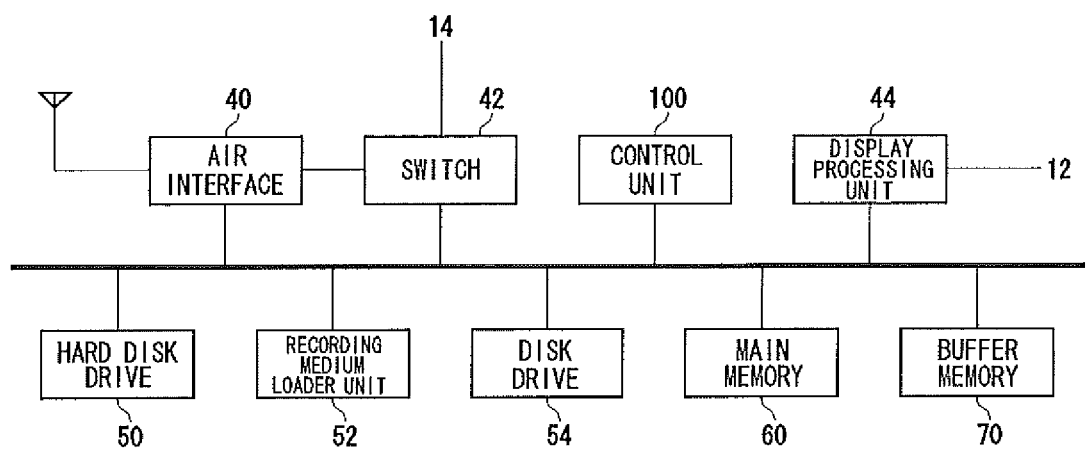
FIG. 4 shows a structure of an information processing apparatus according to an embodiment.

FIG. 4 shows a structure of the information processing apparatus 10. The information processing apparatus 10 is configured by including an air interface 40, a switch 42, a display processing unit 44, a hard disk drive 50, a recording medium loader unit 52, a disk drive 54, a main memory 60, a buffer memory 70, and a control unit 100. The display processing unit 44 has a frame memory that buffers data to be displayed on the display device 12.

The switch 42, which is an Ethernet (registered trademark) switch, is a device that transmits and receives data by connecting to an external device via a wired or wireless communication means. The switch 42, which connects to an external network via a cable 14, is so configured as to be able to receive image data or content file required for the execution of contents. Also, the switch 42 connects the air interface 40 which connects to the input device 20 through a predetermined wireless protocol. Various request signals entered by the user in the input device 20 passes through the air interface 40 and the switch 42 so as to be supplied to the control unit 100.

The hard disk drive 50 functions as a storage device for storing data. The recording medium loader unit 52 reads out data from a removable recording medium when the removable medium such as a memory card is mounted. When a read-only ROM disk is mounted, the disk drive 54 recognizes the ROM disk by driving it and then reads out the data. The ROM disk may be an optical disk, a magneto-optical disk or the like. The content file may be stored in the hard disk drive 50 or such a recording medium.

The control unit 100 comprises a multi-core CPU where each CPU has a general-purpose processor core and a plurality of simple processor cores. The general-purpose processor core is called PPU (PowerPC Processor Unit), and the remaining processor cores are called SPUs (Synergistic Processor Units).

The control unit 100 includes a memory controller connected to the main memory 60 and the buffer memory 70. The PPU has a register and is provided with a main processor as a main body for executing the calculation so as to efficiently assign a task serving as a basic processing unit in the application to execute to each SPU. Note that the PPU itself may execute the task. The SPU is provided with a register, a sub-processor as an entity of execution, and a local memory as a local storage area. The local memory may be used as the buffer memory 70.

The main memory 60 and the buffer memory 70, which are storage devices, are each configured as RAM (Random Access Memory). The SPU has a dedicated DMA (Direct Memory Access) controller as a control unit. Thus, the SPU can achieve high-speed data transfer between the main memory 60 and the buffer memory 70, and can also achieve high-speed data transfer between frame memory in the display processing unit 44 and the buffer memory 70. The control unit 100 according to the present embodiment has a plurality of SPU operated in parallel with one another, thereby achieving a high-speed image processing function. The display processing unit 44, which is connected to the display device 12, outputs an image processing result according to a user's request.

In order that a displayed image can be smoothly changed when the processing of enlarging/reducing the displayed image and the processing of moving or shifting the display region are performed, the information processing apparatus 10 according to the present embodiment loads at least a part of the compressed image data into the main memory 60 from the hard disk drive 50. At this time, image data which will be required later is predicted by a read-ahead processing which will be explained next, and such image data is loaded beforehand. Also, a part of the compressed data loaded into the main memory is decoded and then stored in the buffer memory 70. Such an ingenious method as described above allows the image used for the generation of a displayed image to be switched instantaneously with the timing required later.

Figure 5:
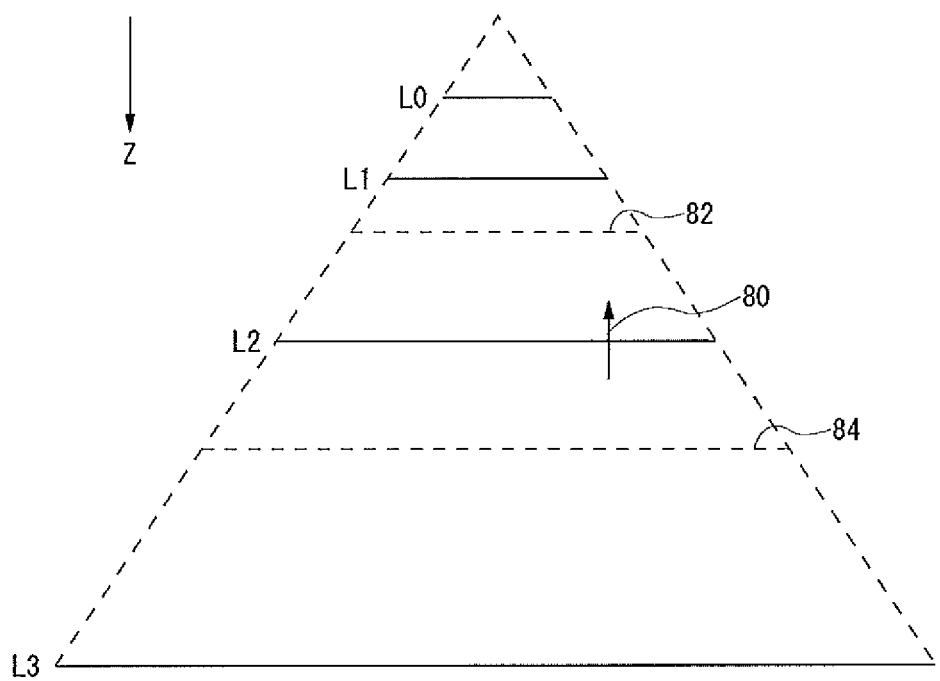
FIG. 5 is a diagram to explain a prefetch processing of image data according to an embodiment.

FIG. 5 is a diagram to explain a prefetch processing of image data. FIG. 5 shows a hierarchical structure of image data, and the respective hierarchical levels are expressed by L0 (0th hierarchical level), L1 (1st hierarchical level), L2 (2nd hierarchical level), and L3 (3rd hierarchical level) starting from top. In a hierarchical image data structure shown in FIG. 5, a position in the depth (Z axis) direction indicates the resolution. That is, the closer to L0 the position in the Z axis is, the lower the resolution will be, whereas the closer to L3 the position in the Z axis is, the higher the resolution will be. In relation to the size of an image displayed on the display, the position in the depth direction, which corresponds to the enlargement factor, is such that the enlargement factor of the displayed image at L2 is ¼ and the enlargement factor thereof at L1 is ¹⁄₁₆ if the enlargement factor of the displayed image at L3 is 1.

Thus, when a displayed image moves from an L0 side to an L3 side along the depth direction, the displayed image is enlarged. In contrast, when the displayed image moves from an L3 side to an L0 side, the displayed image is reduced. An arrow 80 indicates that the viewpoint shift request signal requests a reduction of the displayed image and how it lies across the enlargement factor of ¼ (L2). The information processing apparatus 10 sets the positions of L1 and L2 in the depth direction which are prepared as the tile images 38, to a prefetch boundary in the depth direction. As the image to be displayed lies across the prefetch boundary as a result of the viewpoint shift request signal, the information processing apparatus 10 starts the prefetch processing.

If the enlargement factor of the displayed image is in a neighborhood of L2, the displayed image will be created using an image of L2 (2nd hierarchical level). More specifically, if the enlargement factor of an image to be displayed lies between a switching boundary 82 of an image of L1 and an image of L2 and a switching boundary 84 of the image of L2 and an image of L3, the image of L2 will be used. Thus, if the processing of reducing the images is requested as indicated by the arrow 80, the displayed image is changed from an enlarged image of the image of L2 to a reduced image of the image of L2. At the same time, tile images 38 required in the future that are predicted based on the viewpoint shift request signal are identified and decoded beforehand. In the example of FIG. 5, when the requested enlargement factor based on the viewpoint shift request signal crosses L2, the information processing apparatus 10 reads ahead a tile image 38 of L1 in a reduction direction from the hard disk drive 50 or the main memory 60, then decodes the tile image 38 and writes the decoded title image 38 to the buffer memory 70.

Though a description has been given so far of the prefetch processing in the depth direction, the prefetch processing in the up-down and left-right directions is performed similarly. More specifically, the prefetch boundary is set to the image data expanded in the buffer memory 70 so that the prefetch processing can be started when the display position indicated by the viewpoint shift request signal crosses the prefetch boundary.

Where such hierarchical images are displayed, the aforementioned virtual space defining the coordinates in the hierarchical structure is introduced. Then the frame coordinates in the virtual space are obtained based on the amount of viewpoint shift derived from the viewpoint shift request signal. A viewpoint request is entered by the user through the input device 20. Also, data where a temporal change in the viewpoint coordinates is set in advance (such data will be hereinafter referred to as "scenario data") is associated with hierarchical data, and the display regions will be automatically changed by reading out the already-set viewpoint coordinates from this scenario data at a display stage.

Figure 6:
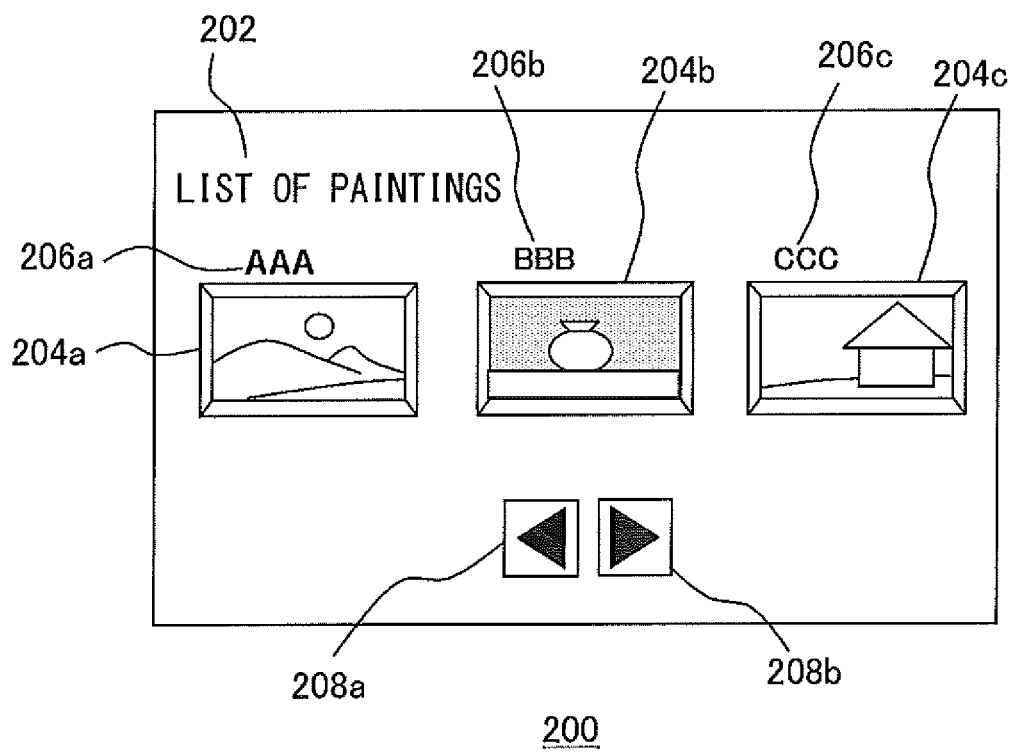
FIG. 6 shows an exemplary image display achieved by employing the present embodiment.
Figure 7:
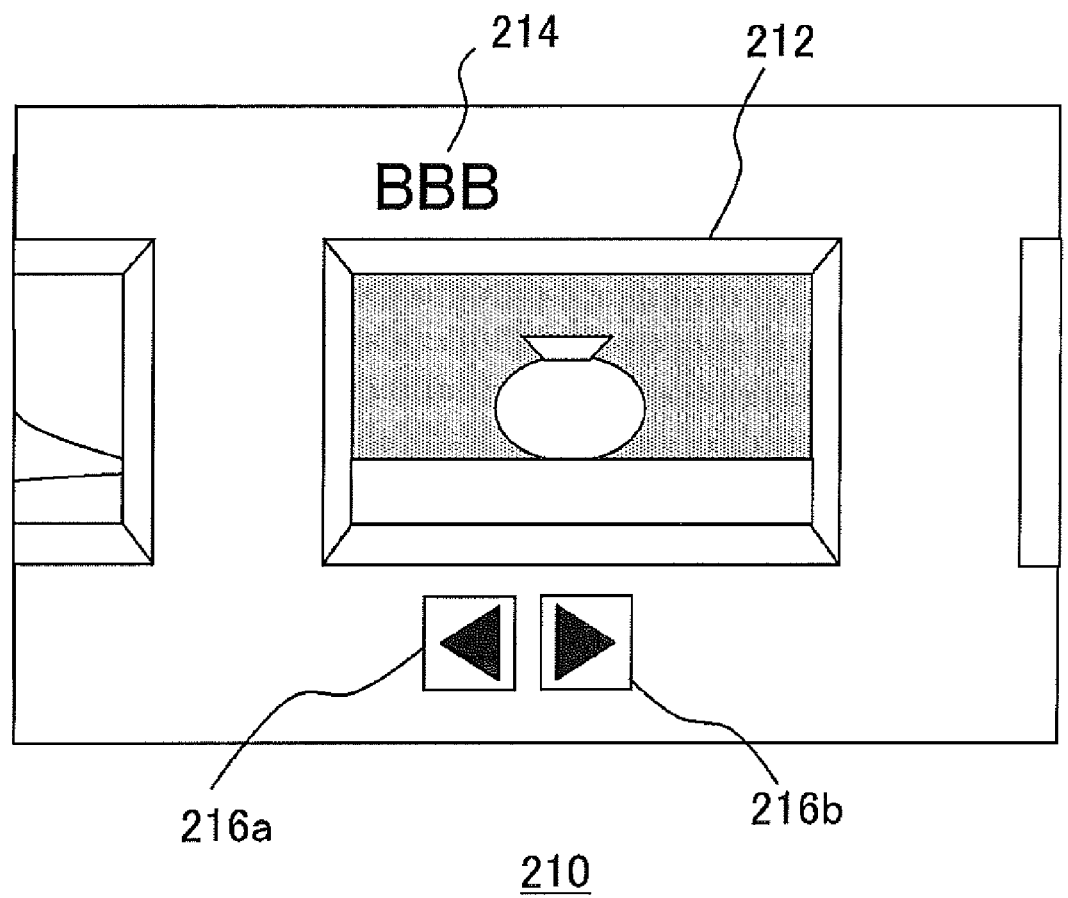
FIG. 7 shows an exemplary image display achieved by employing the present embodiment.

Content in which a plurality of image data including such hierarchical image data are integrated is created and processed in the present embodiment. FIG. 6 and FIG. 7 each shows the image display which can be achieved by employing the present embodiment. FIGS. 6 and 7 are examples of displayed images displaying a picture record in an exhibition of paintings. FIG. 6 is an initial image, and FIG. 7 is an image displayed when a part of the initial image is enlarged.

An initial image 200 of FIG. 6 includes an item display 202 indicating that the display content is a "list of paintings", image displays 204*a*, 204*b* and 204*c* where three paintings are displayed among exhibited paintings, title displays 206*a*, 206*b* and 206*c* indicating the titles of the respective images, and forward/reverse button displays 208*a* and 208*b* that receive an input by which to display other paintings in consequence by moving the arrangement of the paintings to right and left. Hereinafter, each of the respective images that constitute such a displayed image is referred to as "elemental image".

Assume in the initial image 200 that the images displayed in the image displays 204a, 204b and 204c are hierarchical image data each having a hierarchical structure. In other words, though images of relatively small size are displayed in FIG. 6, an image display of high resolution where, for example, detailed feel of a brush may be even verified can be made if the user requests the enlargement of a desired spot. Assume also that other images used for the item display 202, the title displays 206a, 206b and 206c, and the forward/reverse button displays 208a and 208b each has a structure of general image data which is not the hierarchical image data.

When, in this content, the user activates one of the forward/reverse button displays 208a and 208b using the input device 20 and then inputs an instruction of his/her decision, the array of paintings is moved to the left or the right. As the painting is enlarged while a desired painting is being displayed, the details of the painting can be verified. FIG. 7 shows an image 210 in the middle of a step where the image display 204b in FIG. 6 is being enlarged. Besides a displayed image 212 of an enlarged image of the image display 204b in FIG. 6, the image 210 includes a title display 214 thereof and forward/reverse button displays 216a and 216b.

The title display 214 and the forward/reverse button displays 216a and 216b for the image 210 of FIG. 7 correspond respectively to the title display 206b and the forward/reverse button displays 208a and 208b for the initial image 200 of FIG. 6. Although the title display 214 is enlarged and parallel-translated in conjunction with the enlargement and parallel translation of the image display 212, the position and the size of the forward/reverse button displays 216a and 216b are not changed. In order to create such an image, a correlation and/or linkage and non-linkage between the elemental images including the hierarchical images are defined in the present embodiment. Then, these definitions are managed by compiling them into one data structure as a whole as "image correspondence data", so that the efficiency of processing at the time of content preparation and display is improved.

Note that since it is not necessary to enlarge the frame part of the image display 212 so as to display the detail thereof, the data may not be converted into a hierarchical structure and may be separated from the image data of the paintings. With this arrangement, if the enlargement factor shown in FIG. 7 for example is set as a threshold value and if the enlargement is further done past the threshold value, the title display 214 and the frame of the painting are not linked to the enlargement of the painting. In such a case, an embodiment can be achieved where only the inside of the frame is enlargeable up to the maximum resolution.

In general, to show the image display as in FIG. 6, it is only necessary to prepare data for which the data of elemental images are associated with the coordinates indicating the arrangement within the screen, if all of the elemental images does not have the hierarchical structure. This applies to the case where part of the elemental images are moving images. In the present embodiment, on the other hand, the hierarchical image data and other image data are mixed together. Thus, a complex image display as shown in FIG. 6 and FIG. 7 can be made. Note, however, that this embodiment cannot be achieved only by simply associating the data of images with the arrangement information within the screen. This is because the hierarchical image data has a unique coordinate system referred to as the virtual space to achieve a wide range of variation in enlargement factor.

Figure 8:
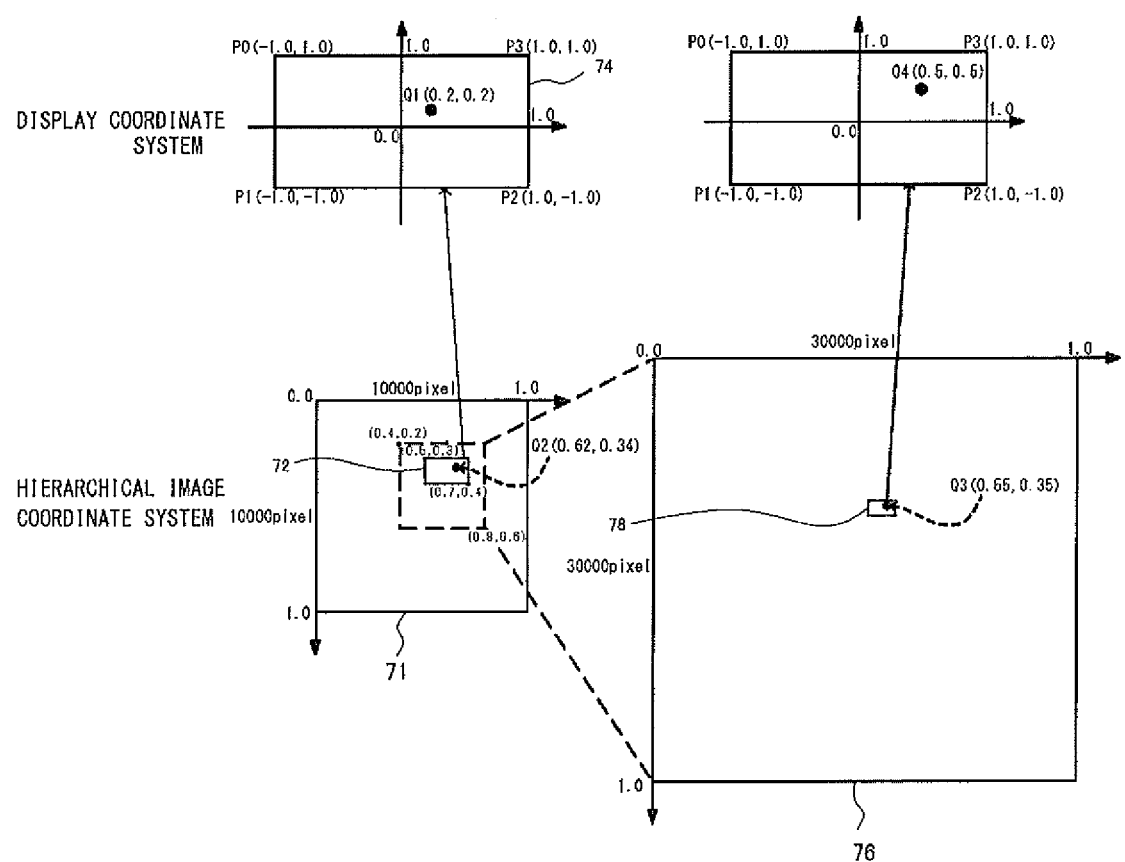
FIG. 8 is a diagram with which to explain the correspondence between a coordinate system of hierarchical image data and a display coordinate system in an embodiment.

FIG. 8 is a diagram with which to explain the correspondence between the coordinate system of the hierarchical image data and a display coordinate system (global coordinate system). FIG. 8 shows a hierarchical image coordinate system of an image decoded from hierarchical image data (see the lower part of FIG. 8) and display coordinates (see upper part of FIG. 8). In displaying a hierarchical image, a part of image data at a certain hierarchical level included in the hierarchical image data is decoded according to the position of the viewpoint. The calculation in this processing is done using the hierarchical image coordinate system. The left side of FIG. 8 represents a case of display using an image 71 of a hierarchical level of 10000×10000 pixels. At this time, a coordinate system is formed by normalizing 10000 pixels as 1.0 with the origin set at the upper left of the image 71. On such a coordinate system, the frame coordinates of a display region 72 are obtained as (0.5, 0.3) for the upper left and (0.7, 0.4) for the lower right, for instance, based on the position of the viewpoint.

As shown on the upper part of FIG. 8, this display region is rendered as a region 74 defined by the vertices of P0(−1.0, 1.0), P1(−1.0, −1.0), P2(1.0, −1.0), P3(1.0, 1.0) on the display coordinate system. For example, relating the vertices P0 to P3 to the four corners of the screen of the display device will result in a display of the hierarchical image on the entirety of the display. In this rendering process, point Q1(0.2, 0.2) on the display coordinate system, for instance, corresponds to point Q2 (0.62, 0.34) on the hierarchical image coordinate system.

Here, if the viewpoint is shifted in the direction of enlargement, a hierarchical image coordinate system on the right side of the lower level of FIG. 8 will be formed, for instance. In this example, a display is made using an image 76, enlarged to 30000×30000 pixels, of a region of (0.4, 0.2) at the upper left and (0.8, 0.6) at the lower right on the hierarchical image coordinate system at the enlargement factor of the image 71. The image 71 and the image 76 are ones having decoded the image data of different hierarchical levels. At this time, a coordinate system is formed having 30000 pixels as 1.0 with the origin set at the upper left of the image 76. Relative to such a coordinate system, the frame coordinates of a region 78 to be displayed as a result of the enlargement are calculated based on the position of the viewpoint and rendered as the above-described region on the display coordinate system. This will result in a display of the enlarged image on the entirety of the display.

In this enlargement process, point Q2 (0.62, 0.34) on the hierarchical image coordinate system of the image 71 of 10000×10000 pixels will be point Q3(0.55, 0.35) on the hierarchical image coordinate system of the image 76 of 30000×30000 pixels, which will be converted to point Q4(0.5, 0.5) on the display coordinate system. In other words, there are cases where one point on an image can be subjected to positional shift on the display as a result of enlargement/reduction.

Also, whereas 1 pixel corresponds to 1/10000 on the hierarchical image coordinate system of the image 71, 1 pixel corresponds to 1/30000 on the hierarchical image coordinate system of the image 76. Hence, when a horizontal shift (parallel translation) of the viewpoint is made relative to an image, simply using the coordinate change on the hierarchical image coordinate system in the calculation of the shift amounts of other linked elemental images without taking the enlargement factor into account will result in the successive displacements of their relative positions. Since a hierarchical image is subject to a change in the coordinate system depending on which hierarchical level of image data is used as described above, it is necessary to perform coordinate transformations on the other linked elemental images in response to the change.

Figure 9:
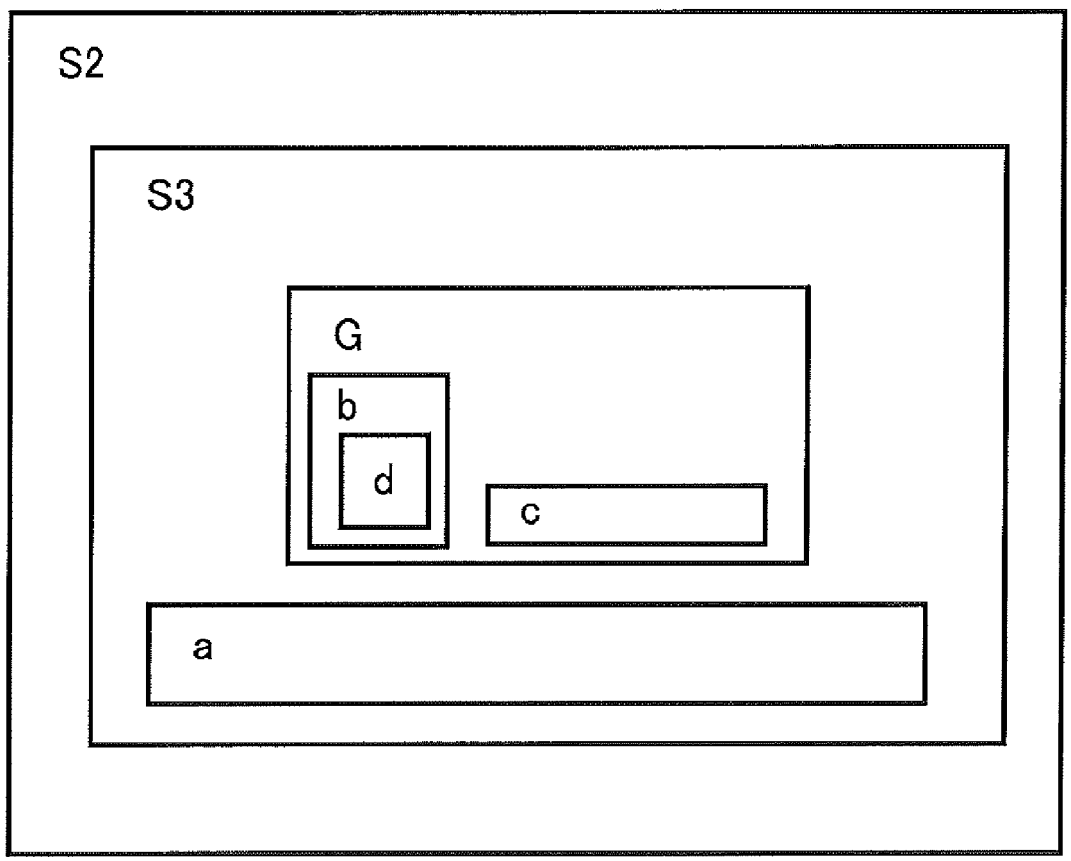
FIG. 9 shows an example of layout of an image to be displayed which is constituted by a plurality of elemental images, in an embodiment.
Figure 10:
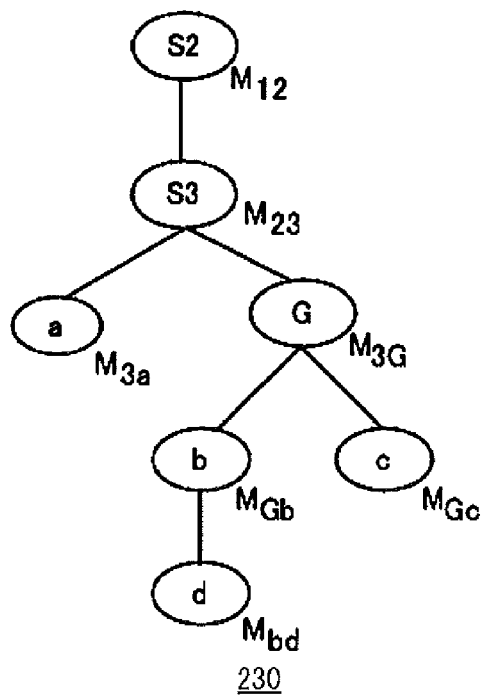
FIG. 10 is a conceptual diagram of image correspondence data to be prepared for the display of an image having a positional relation of FIG. 9.

Thus, image correspondence (correlation) data are introduced as already described. The image correspondence data define the relative positions of the elemental images constituting an image to be displayed such that a shift of an elemental image, such as a hierarchical image, causes the shifts of the other elemental images in such a manner as to maintain their relative positions. Also, as for the non-linked elemental images, their relative positions in relation to the display coordinate system, which is a global coordinate system, or some other coordinate system equivalent thereto are defined. FIG. 9 shows an example of layout of an image to be displayed which is constituted by a plurality of elemental images, and FIG. 10 is a conceptual diagram of image correspondence data to be prepared for the display of an image having the layout such as shown in FIG. 9. In the layout example 220 of FIG. 9, S2 represents a display, and images S3, a, b, c, d, and G are elemental images, respectively, which are shown in their respective rectangular regions enclosing them. Here the image G has a hierarchical image data structure.

To implement an arrangement like this, image correspondence data as shown in FIG. 10 are prepared. The image correspondence data 230 has a tree structure connecting elemental images which have relative relationships with each other. And when an elemental image is to be linked to another elemental image, for example, when the elemental image is pasted on the other elemental image, a tree structure is formed by defining the former as a child node and the latter as a parent node.

In the examples of FIG. 9 and FIG. 10, the image "S2" is set as a root node, and the image "S2" is associated with the elemental image "S3" as a child node whose parent node is the image "S2". The elemental images "a" and "G" which are child nodes whose parent node is the elemental node "S3" are associated with the elemental image "S3". Similarly, the elemental images "b" and "c" which are child nodes whose parent node is the elemental image "G" are associated with the elemental image "G", and the elemental image "d" which is a child node whose parent node is the element image "b" is associated with the elemental element "b".

As a result, the settings such as the following examples may be easily expressed. Examples include that the elemental image "S3" is not to be linked to any of the elemental images, the elemental image "a" is not to be linked to the elemental image "G", the elemental images "b" and "c" are to be linked to the elemental image "G", and the elemental image "d" is to be linked to the elemental image "b", for instance. Since a linkage relation can be set as the tree structure, the elemental image "d" is eventually linked to the elemental image "G".

In the image correspondence data, the relative positional information between a parent node and a child node is expressed as a coordinate transform matrix. "$M_{12}$", "$M_{23}$" and the like near the nodes shown in FIG. 10 indicate coordinate transform matrices. A coordinate transform matrix is generated in the light of parameters of position, rotation, and enlargement/reduction. The positional coordinates in the display coordinate system, namely the position finally determined for the screen, is determined by multiplying the vertices of each image by the coordinate transform matrix. For an elemental image having its parent node, it is eventually traced back to a root node when the coordinate transform matrix of the parent node is multiplied in sequence.

For example, the coordinates in the coordinate system of the elemental image "d" is converted into the coordinate system of the elemental image "b" which is the parent node of the elemental image "d" by the coordinate transform matrix "$M_{bd}$". The coordinates in the coordinate system of the elemental image "b" is converted into the coordinate system of the elemental image "G" which is the parent node of the elemental image "b" by the coordinate transform matrix "$M_{Gb}$". The coordinates in the coordinate system of the elemental image "G" is converted into the coordinate system of the elemental image "S3" which is the parent node of the elemental image "G" by the coordinate transform matrix "$M_{3G}$". The coordinates in the coordinate system of the elemental image "S3" is converted into the coordinate system of the elemental image "S2" which is the parent node of the elemental image "S3" by the coordinate transform matrix "$M_{23}$". The coordinates in the coordinate system of the elemental image "S2" is converted into the display coordinates of FIG. 8 by the coordinate transform matrix "$M_{12}$".

As described above, for the hierarchical image "G", the coordinate transform matrix "3G" with which to convert the hierarchical image "G" into its parent node is varied depending on the range of the enlargement factor. Thus, when, as with the image correspondence data, each elemental image is associated with constituting a tree structure and thereby the coordinate transform matrix "$M_{3G}$" only is varied, the coordinate transform of its child node image will be varied correspondingly. Thus, even though the coordinate system of hierarchical images is changed, the content of arithmetic processing will remain virtually unchanged and therefore the processing efficiency in the displaying is excellent.

Figure 11:
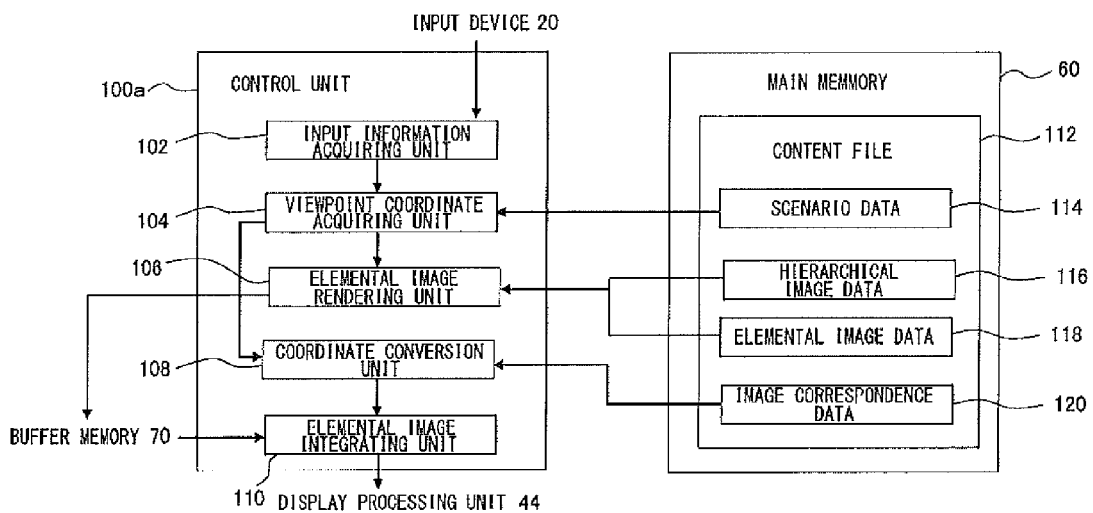
FIG. 11 shows detailed structures of a control unit and a main memory in an information processing apparatus, having a function of displaying images, in an embodiment.

A description is now given of a configuration of an apparatus for processing content including image displaying. FIG. 11 illustrates a detailed configuration of a control unit 100a, having a function of processing content and displaying the processed content, and the main memory 60. The control unit 100a includes an input information acquiring unit 102 for acquiring information inputted by the user from the input device 20, a viewpoint coordinate acquiring unit 104 for acquiring viewpoint coordinates from the viewpoint shift request signal, an elemental image rendering unit 106 for rendering each elemental image based on the viewpoint coordinates, a coordinate conversion unit 108 for modifying, as appropriate, a coordinate transform matrix based on the viewpoint coordinates and then converting the coordinates of each elemental image, and an elemental image integrating unit 110 for generating one displayed image as a frame by integrating each elemental image.

At the start of content, a content file 112 stored in the hard disk drive 50, for instance, is loaded into the main memory 60. The content file 112 includes scenario data 114 where the motion of a viewpoint is set beforehand, hierarchical image data 116 and other elemental image data 118 that are image data to be displayed, and image correspondence data 120. A part of these data may be, in fact, loaded into the main memory 60 during the processing of the data. Also, the content file 112 may further contain device-dependent data where optimum internal parameters and image correspondence data are set for some content processing apparatuses processing the content. The device-dependent data will be discussed later.

The scenario data 114 is data where the elemental image(s) to be displayed and/or the viewpoint coordinates are associated with time, and the scenario data 114 is used for the content where a scenario mode for automatically changing the viewpoint is introduced. Note that the scenario data 114 may not be included in the content file 112 if the viewpoint is shifted by the use's view point shift request only. Similarly, if the viewpoint is shifted by the scenario data 114 only, the viewpoint shift request signal from the input device 20 may not be received. The content may be one in which these modes are switchable.

Figure 15:
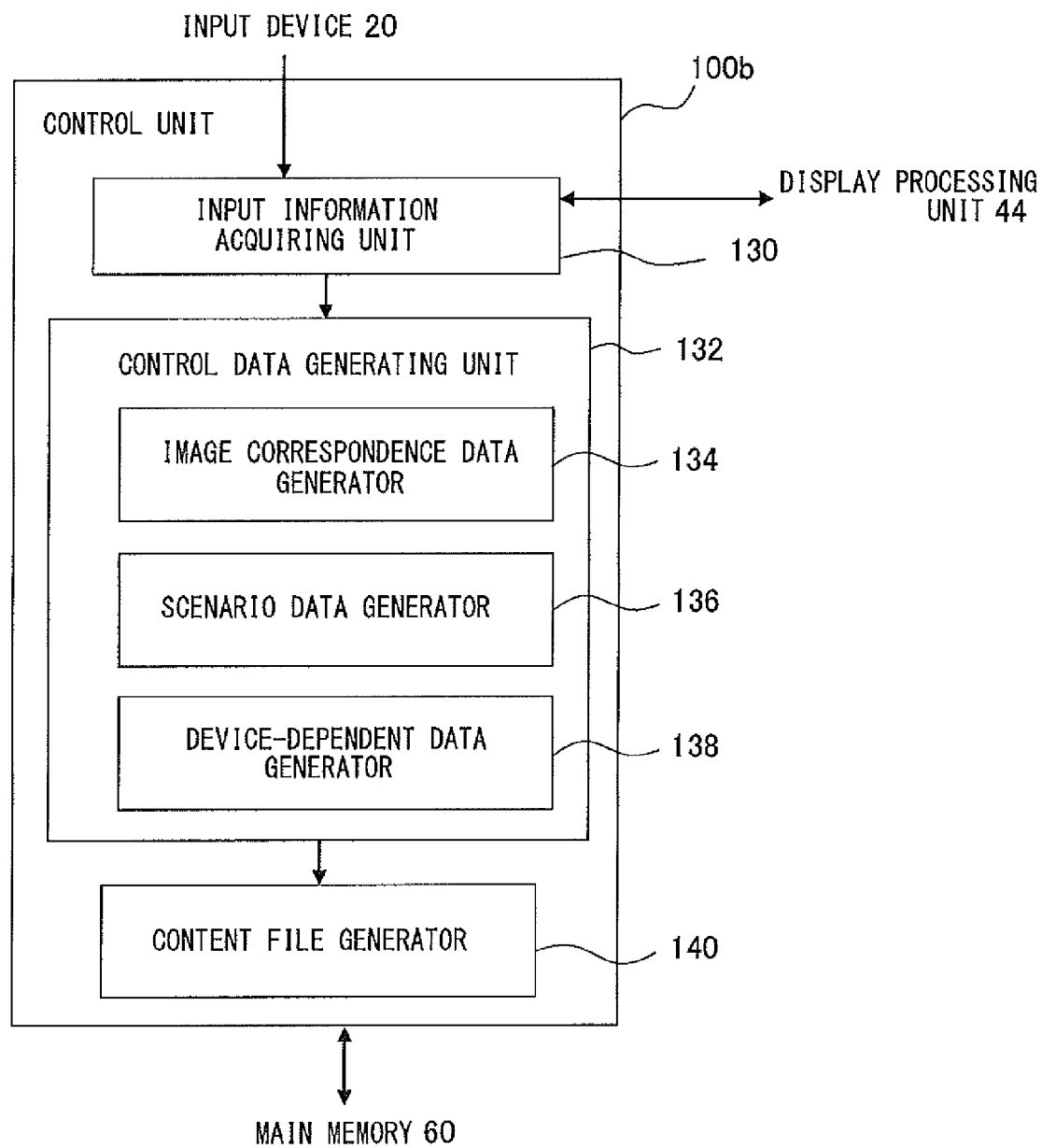
FIG. 15 shows a detailed structure of a control unit in an information processing apparatus, having a function of preparing a content file, in an embodiment.

In FIG. 11 and FIG. 15 shown later, the structural components described as functional blocks that perform various processings may be implemented hardwarewise by elements such as a CPU (Central Processing Unit), memory and other LSIs, and softwarewise by memory-loaded programs or the like. As described already, the control unit 100 has one PPU and a plurality of SPUs, and each functional block may be configured by PPU and SPUs, alone or combined together. Therefore, it will be obvious to those skilled in the art that the functional blocks may be implemented by a variety of manners including hardware only, software only or a combination of both and should not be considered as limiting.

The input information acquiring unit 102 acquires the inputs, entered by the user to the input device 20, of request signals indicating the end or start of content, menu selection, viewpoint shift and so forth. The viewpoint acquiring unit 104 detects that the input information acquiring unit 102 has acquired the signals indicating the start of content or viewpoint shift request, and then acquires viewpoint coordinates corresponding thereto. The viewpoint coordinates can be obtained as follows, for example. At the start of content, the viewpoint coordinates may be obtained from predetermined coordinates used to display an initial image. Also, at the time of viewpoint shift request, the viewpoint coordinates may be obtained by shifting the viewpoint by an amount of viewpoint shift which is determined by multiplying the viewpoint movement rate derived from an amount of operation of the input device 20 or the like by time interval to display the next frame. Note that if the viewpoint is shifted based on the scenario data 114, the viewpoint coordinates associated with each time set in the scenario data 114 may be read out.

The elemental image rendering unit 106 reads the necessary hierarchical image data 116 and other elemental image data 118 from the main memory 60 and decodes them. The thus decoded image data are stored in the buffer memory 70. If the same image has been decoded in the past, the image in the buffer memory 70 will be reused and therefore the decoding process can be skipped. Every time the hierarchal level used for the displaying is switched, the coordinate transform unit 108 modifies a coordinate transform matrix, among those set in the image correspondence data 120, that converts the coordinates from those of a hierarchical image to those of its parent node.

In the case of the image correspondence data 230 shown in FIG. 10, the coordinate transform matrix "$M_{3G}$" is modified. A concrete method for calculating the coordinate transform matrix will be discussed later. The coordinates of four corners in the respective elemental images set to the respective nodes of the image correspondence data 120 are converted so that the coordinates thereof in their individual coordinate systems can be traced back to the root node of the tree structure. In this manner, the coordinates after the shift of the viewpoint are calculated in the display coordinate system. Data where the identification information of an elemental image and the coordinates of four corners in the display coordinate system are associated with each other is sent to the elemental image integrating unit 110. The elemental image integrating unit 110 reads the elemental image from the buffer memory 70, generates a frame to be finally displayed, based on the coordinates of four corners in the display coordinates of the image, and stores the frame in the frame memory of the display processing unit 44.

Figure 12:
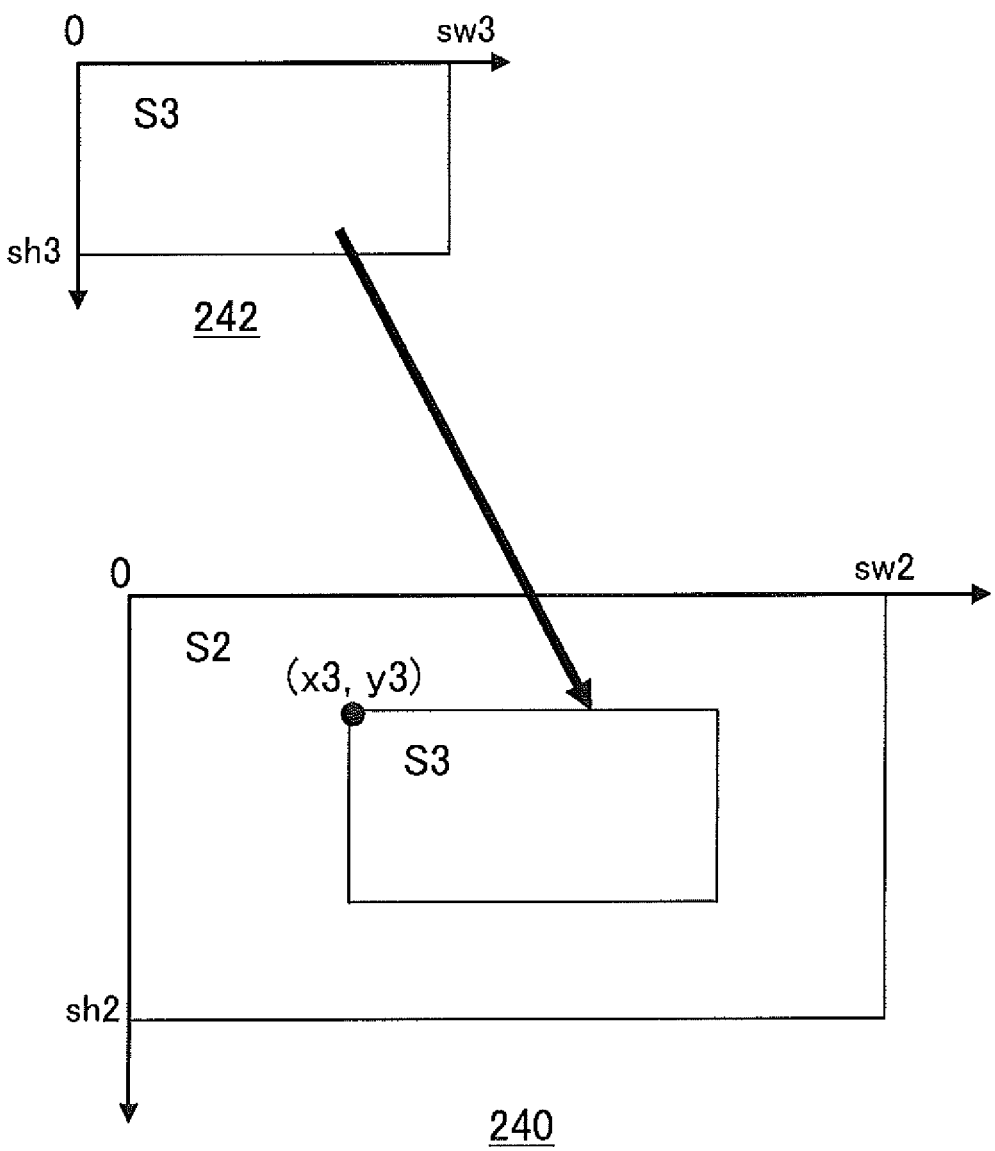
FIG. 12 is a diagram to explain a coordinate conversion of images, whose resolution remains unchanged, in an embodiment.

A description is next given of concrete examples of the transform matrix. FIG. 12 is a diagram to explain a coordinate conversion of images, whose resolution remains unchanged, in an embodiment. FIG. 12 shows the coordinate conversion regarding the image S3, which is, as a child node, associated with the image S2 as shown in FIG. 10. In this case, assume that the image S3 is an image having pixels of a width sw3 and a height sh3, and the image S2 is an image having pixels of a width sw2 and a height sh2. The region of each image with its origin set at the upper left thereof is expressed by a coordinate system where one pixel directly serves the unit of the coordinate.

That is, the image S3 exists in a region where and 0≤x≤sw3 and 0≤y≤sh3 in the coordinate system of the image S3, and the image S2 exists in a region where 0≤x≤sw2 and 0≤y≤sh2 in the coordinate system of the image S2. Here, if the image S3 is arranged such that the upper left corner thereof is located on the coordinates of (x3, y3) in the coordinate system of the image S2, the coordinate transform matrix "$M_{23}$" which is used to convert the coordinates from a coordinate system 242 of the image S3 to a coordinate system 240 of the image S2 is expressed as follows.

$$M_{23} = \begin{bmatrix} 1 & 0 & 0 & x3 \\ 0 & 1 & 0 & y3 \\ 0 & 0 & 1 & 0 \\ 0 & 0 & 0 & 1 \end{bmatrix} \quad \text{(Eq. 1)}$$

Expressed as follows is the coordinate transform matrix $M_{12}$ which is used to convert the coordinates of the image S2 into the display coordinates as shown in FIG. 8 where the origin is set at the center and the x-coordinate and y-coordinate are both defined in a range from −1.0 to 1.0.

$$M_{12} = \begin{bmatrix} \frac{2}{sw2} & 0 & 0 & -1 \\ 0 & \frac{2}{sh2} & 0 & 1 \\ 0 & 0 & 0 & 0 \\ 0 & 0 & 0 & 1 \end{bmatrix} \quad \text{(Eq. 2)}$$

Thus, in order that the coordinates in the coordinate system of the image S3 is converted up to the display coordinate system, the tree structure of FIG. 10 is traced back and then the conversion is done from the image S2 at the root node into the display coordinate system. As a result, the conversion matrix $M_{13} = M_{12} \cdot M_{23}$ is multiplied.

Figure 13:
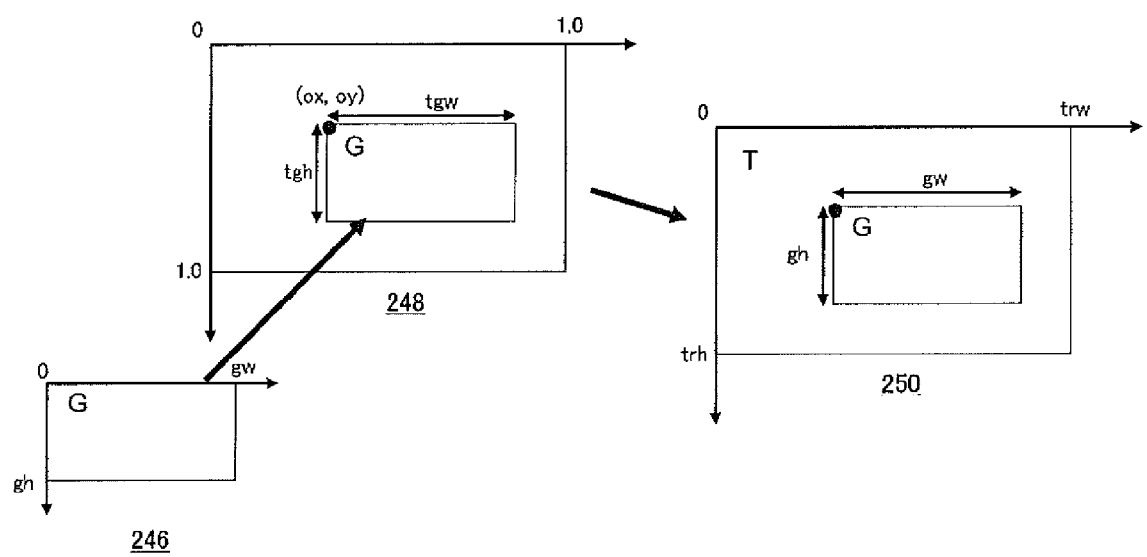
FIG. 13 is a diagram to explain coordinate conversions of a hierarchical image in an embodiment.

A description is next given of a method for processing the coordinate systems of hierarchical image data. FIG. 13 is a diagram to explain the coordinate conversions of a hierarchical image. As described above, the hierarchical level of image data used is varied depending on the range of required enlargement factors. Then, the region to be displayed at the hierarchical level is determined by the x-coordinate and the y-coordinate of the viewpoint. An image G shown in FIG. 13 is an image of the display region determined in the aforementioned manner, and the size of the image G is such that the width is gw pixels and the height is gh pixels. Similar to the image S3 and the like, a coordinate system 246 of this hierarchical image with its origin set at the upper left is expressed by a coordinate system where one pixel directly serves as the unit of the coordinate.

In order to vary this image G according to the required enlargement factor, a texture of the image G is generated. At this time, generated is the texture where the image G exists in a position for the parent node of the image G (e.g., the image S3 in the case of FIG. 10). A hierarchical image coordinate system 246 of the image G is first converted into a texture coordinate system 248. That is, assuming that the image S3 is the entire texture, the image G is pasted on this texture. As is generally known, the texture coordinate system 248 is a coordinate system having values from 0 to 1.0 in an x direction and a y direction, respectively. If, in this texture coordinate system, the image G is arranged such that the upper left corner is positioned on the coordinates (ox, oy) based on the relative position of the image G in relation to the image S3, the coordinate transform matrix "$M_{TG}$" which is used to convert the hierarchical image coordinate system 246 into a coordinate system 250 of a texture image T by way of the texture coordinate system 248 is expressed as follows.

$$M_{TG} = \begin{bmatrix} tgw & 0 & 0 & \frac{gw}{tgw} \times ox \\ 0 & tgh & 0 & \frac{gh}{tgh} \times oy \\ 0 & 0 & 0 & 0 \\ 0 & 0 & 0 & 1 \end{bmatrix} \quad \text{(Eq. 3)}$$

Here, tgw and tgh are the width and the height of the image G in the texture coordinate system 248, respectively. The size of the texture image T is determined by the resolution of the hierarchical image G and the relative size of the elemental image S3 which is the parent node of G. In other words, when the image of hierarchical data is directly used without being enlarged or reduced, the size is one required for the elemental image S3 to keep the relative size unchanged. In FIG. 13, the width trw and the height trh of the texture image T are given by trw=gw/tgw and trh=gh/tgh, respectively. The original image G can be placed relative to the elemental image S3 by pasting this texture image T on the image S3. In this case, a coordinate transform matrix "M3T" which is used to convert the coordinate system 250 of the texture image T into the coordinate system 242 of the elemental image S3 of FIG. 12 is expressed as follows.

$$M_{3T} = \begin{bmatrix} \frac{sw3}{trw} & 0 & 0 & 0 \\ 0 & \frac{swh}{trh} & 0 & 0 \\ 0 & 0 & 0 & 0 \\ 0 & 0 & 0 & 1 \end{bmatrix} \quad \text{(Eq. 4)}$$

As a result, the coordinate transform matrix "$M_{3G}$" which is used to convert the coordinate system of the hierarchical image G to that of the elemental image S3 is given by $M_{3G}=M_{3T} \cdot M_{TG}$. In the image correspondence data of FIG. 10, the coordinate transform matrices $M_{bd}$, $M_{Gb}$, $M_{Gc}$, and $M_{3a}$ can be calculated in a similar manner to $M_{23}$. In this manner, when the hierarchical level of image data use varies according to the viewpoint which means eventually the requested enlargement factor, the coordinate transform matrix $M_{3G}$ which is used to convert the coordinates of the hierarchical image into those of the elemental image of its parent node is modified according to the thus shifted viewpoint. Thus, the linkage and non-linkage between the elemental images can be set, in such a manner as to incorporate the hierarchical image data, only by modifying the coordinate transform matrix $M_{3G}$.

Figure 14:
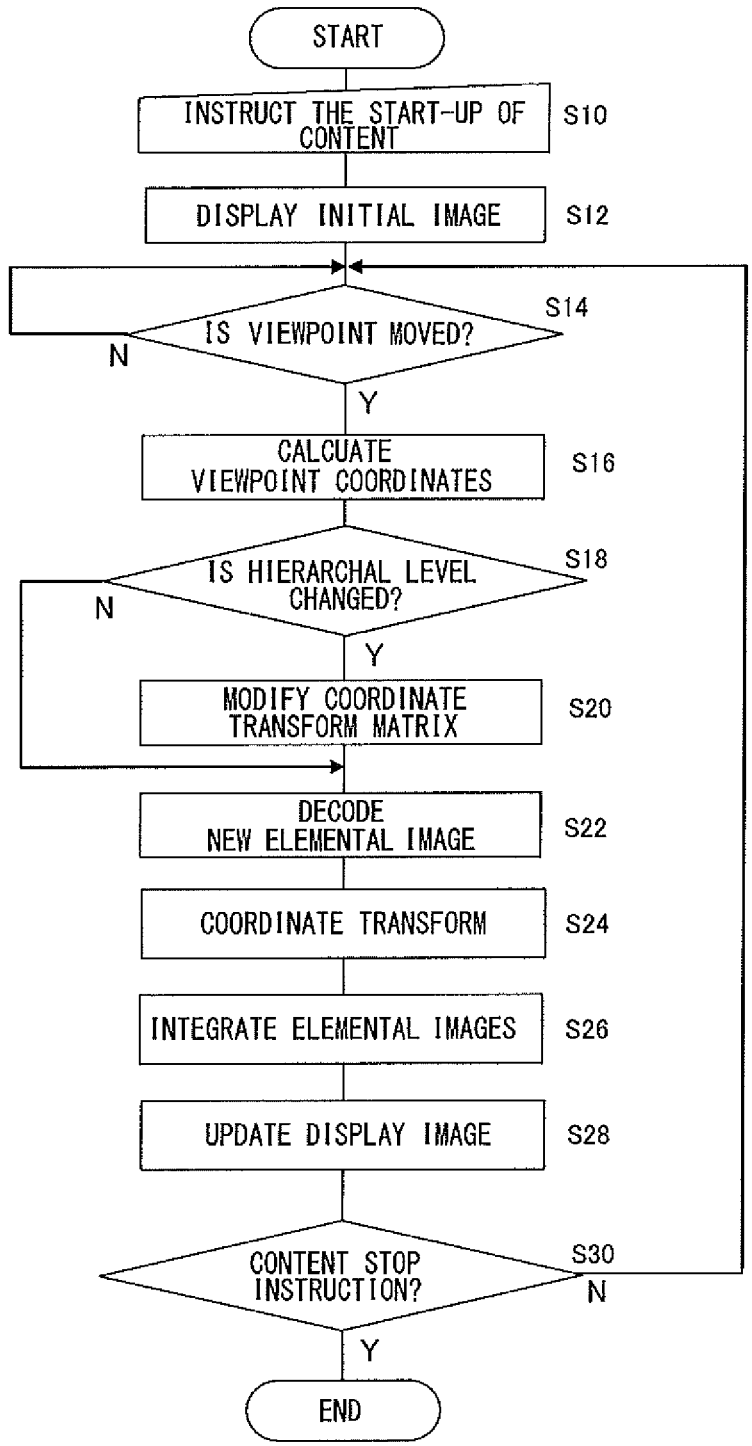
FIG. 14 is a flowchart showing a procedure of content accompanying the displaying of images.

An operation performed by the structure described so far will now be described. FIG. 14 is a flowchart showing a procedure of content accompanying the displaying of images according to the present embodiment. Though only the processing concerning the display of images is shown in FIG. 14, it is obvious to those skilled in the art that other various types of processings can be simultaneously carried out depending on the content. As the user first inputs his/her instruction to start up content to the information processing apparatus 10 (S10), an initial image is displayed (S12).

More specifically, the hierarchical image data and the elemental image data are decoded based on the viewpoint which has been set for the displaying and, at the same time, the coordinates are converted based on the image correspondence data so as to determine the position of each elemental image in the display coordinate system. Then the initial image is displayed by integrating the elemental images. Alternatively, an image where each elemental image has been arranged may be prepared beforehand as the initial image, so that this image only may be displayed.

The processing concerning the displaying of the image stands ready before the viewpoint shift request is made by the user through the input device 20 (N of S14). As the viewpoint shift request is made (Y of S14), the viewpoint coordinates are calculated in response to the request (S16). If the shift of the viewpoint has already been set by scenario data, the viewpoint coordinates will be successively read out from the scenario data.

Then, whether the hierarchical level to be used in the hierarchical image data is changed due to the shift of the viewpoint coordinates or not is verified (S18). If the hierarchical level is changed, the node of the hierarchical image will be extracted from the image correspondence data and then a coordinate transform matrix associated with the extracted node will be read out so as to be modified as described above (S20). It is to be noted here that the matrix after the modification may be stored in a not-shown register or the like, and the values stored in the register may be later used when this matrix is read out or modified.

If the transform matrix is modified in Step S20 or if the hierarchical level is not changed in Step S18 (N of S18), a new elemental image will be decoded as necessary (S22). If data that have been decoded beforehand are stored in the buffer memory 70, the data will be used and therefore Step S22 can be skipped. On the other hand, the coordinates of each elemental image is converted based on the image correspondence data, and the coordinates in the display coordinate system is obtained (S24).

Then, each elemental image that has been decoded is placed on the obtained coordinates and thereby the elemental images are integrated so as to generate a new displayed image (S26). The thus generated image data are stored in the frame memory and are outputted to the display device 12 with proper timing so as to update the displayed image (S28). The processings of S14 to S28 are repeated unless an instruction to terminate the content is inputted (N of S30). As the instruction to terminate the content is inputted (Y of S30), the process for displaying the image is also terminated.

A description is now given of an embodiment in which the file of the content described so far is generated. FIG. 15 shows a detailed structure of a control unit 100b in an information processing apparatus 10, having a function of preparing the above-described content file, according to the present embodiment. The information processing apparatus 10 may be of the same structure as that described in conjunction with FIG. 4. An input device 20 may be any of generally used input devices such as a keyboard, a mouse, a trackball, a touch pen, and buttons, besides the device having the appearance described in conjunction with FIG. 2. In other words, the input device 20 may be any of such device as long as the user can enter necessary information while viewing a setting screen displayed on the display device 12.

Though the control unit 100b may include therein other functional blocks such as the functional block for processing content and displaying the image as shown in the control unit 100a of FIG. 11, such functional blocks are omitted in FIG. 15. On the other hand, the information processing apparatus 10 provided with the control unit 100b having only the functions as shown in FIG. 15 may be realized as an authoring apparatus.

The control unit 100b includes an input information acquiring unit 130 for acquiring the information set by the user from the input device 20, a control data generating unit 132 for generating the control data, used to control the image displaying during the displaying of content, based on the information set by the user, and a content file generator 140 for generating a content file associated with the image data and control data.

The input information acquiring unit 130 functions as an interface that is used to input the information to be set by the user. Accordingly, the input information acquiring unit 130 controls the display processing unit 44 and has the display device 12 display a setting screen exemplified later. Then as the user operates the input device 20 to enter an input, the input information acquiring unit 130 acquires the input signal and supplies the acquired signal to the control data generating unit 132.

The control data generating unit 132 includes therein an image correspondence data generator for generating image correspondence data based on the information on the arrangement of an elemental image inputted by the user, a scenario data generator 136 for generating scenario data based on the information on scenario such as display regions and their display order inputted by the user, and a device-dependent data generator 138 for generating the control data depending on a processing device based on the information on an device for processing the content. The actual data to be generated among the image correspondence data, the scenario data, and the device-dependent data may be selected by the user according to the content.

The content file generator 140 associates the data generated by the each functional block of the control data generating unit 132 with data on an elemental image, to be displayed, which is set by the user, and then stores them to the main memory 60. The final content file may be provided as a recording medium that has stored various types of data according to the aforementioned correspondence relation.

Figure 16:
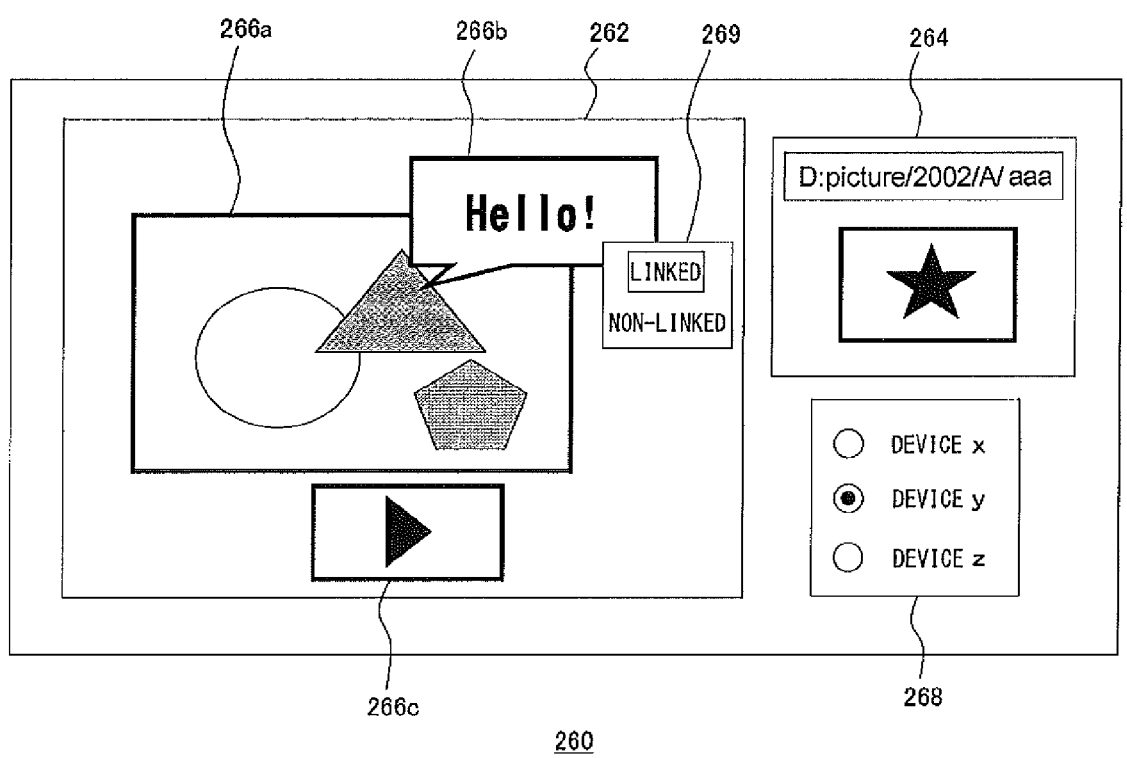
FIG. 16 shows an example of a screen displayed on a display device when a user enters the settings of various kinds of information.

FIG. 16 shows an example of a screen displayed on the display device 12 when the user enters the settings of various information. An image construction setting screen 260 includes an image construction creating region 262, an elemental image selection region 264, and a device selection region 268. The user calls out a desired elemental image for display at the elemental image selection region 264. Then the user places the elemental images in desired positions within the image construction creating region 262 through drag-and-drop or like operations using the pointing device of the input device 20. In FIG. 16, elemental images 266a, 266b, and 266c are placed in this manner.

It is to be noted that although the elemental images to be called out are shown as two-dimensional images in FIG. 16, the elemental images may be moving images, texts, or the like. Also, as already mentioned, the present embodiment allows easy conversion of the coordinate systems of individual elemental images by the use of the image correspondence data. Therefore, various image processings within the individual coordinate systems can be performed before the rendering thereof as two-dimensional images.

The arrangement may be such that when the user performs a predetermined operation on the input device 20 after specifying the elemental image 266b with a cursor or the like, a link setting window 269 is displayed in the neighborhood of the elemental image 266b so as to facilitate the setting of link or non-link thereof to another elemental image. The arrangement may be further such that the character strings of "Link" and "Non-link" are displayed in the link setting window 269 and the setting of link or non-link can be effected by the user's selection.

Note that since the elemental image for which the "Link" is set is to be a child node, the user is further required to select an elemental image to be linked, i.e., an elemental image as a parent node. In the case of FIG. 16, with "Link" selected, the elemental image 266b, for instance, can be shifted in such a manner as to follow the shift of the elemental image 266a. With "Non-link" selected, the elemental image 266b keeps being displayed in the same position irrespective of any shift of the elemental image 266a.

To generate scenario data, a scenario data setting mode can be turned on at the instruction of the user after the placement of elemental images in the image construction creating region 262 is completed. In this mode, the user can shift the viewpoint for the images created by the user, which are displayed in the image construction creating region 262, using the input device 20. Then, by performing a decision operation on the input device 20 at a plurality of desired viewpoints, scenario data to shift the displaying image in the sequence thus decided can be generated. As the case may be, the arrangement may be such that another setting screen which allows the settings of the display time of the elemental images, shift time, shift route, and the like is displayed.

When an image of a hierarchical structure is to be included among the elemental images, the arrangement may be such that the setting for display of a certain elemental image in conjunction only with the image display using a specific hierarchical level is accepted. This setting, as with the scenario setting mode, can be realized by accepting the shift of the viewpoint for the created images, which are displayed in the image construction creating region 262. And a function is provided such that when the user shifts the viewpoint in the enlargement/reduction direction, the shift of the viewpoint is stopped for a predetermined time at the point when there has been a switch of hierarchical levels used for the display of the hierarchical image. During this time, the user calls out a new elemental image in the elemental image selection region 264 and places it in a desired position of the image construction creating region 262.

Figure 17:
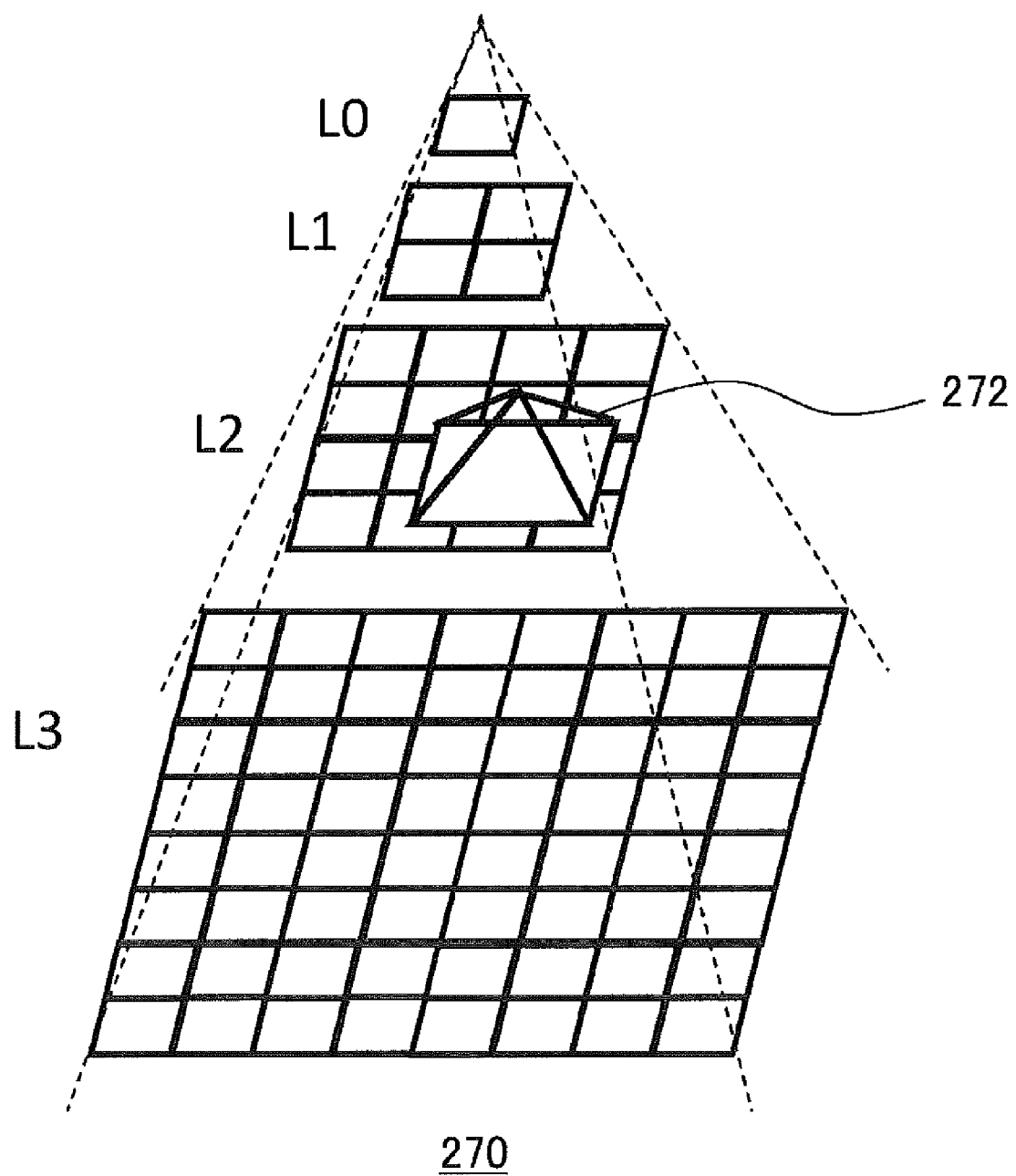
FIG. 17 is a conceptual diagram of hierarchical image data when the setting for display of a certain elemental image in conjunction only with the image display using a specific hierarchical level is accepted, in an embodiment.

FIG. 17 is a conceptual diagram of hierarchical image data when such a setting has been made. In FIG. 17, while hierarchical image data 270 is constituted of the hierarchical levels of L0 to L3, an elemental image 272 is placed on the hierarchical level of L2 only. The elemental image may be a two-dimensional image, but as long as the display continues using the data of the hierarchical level of L2, another elemental image is displayed in the set placement and will be enlarged or reduced together with the hierarchical image. The setting or process at this time is the same as for the images without hierarchical structure. Thus, an embodiment can be realized where other images are partially displayed only when the enlargement factor is within a certain range as a hierarchical image is enlarged or reduced during image display.

An elemental image may be associated with a plurality of hierarchical levels by a similar operation. Further, the setting can also be made such that "link" is effected when a certain hierarchical level is used and "non-link" is effected when any of the other hierarchical levels is used. Using such an arrangement, it is possible to realize an embodiment, such as the frame of a painting described with reference to FIG. 7, in which a hierarchical image only will be enlarged past the threshold value of enlargement factor such that both kinds of images are linked until the enlargement factor is reached.

Referring back to FIG. 16, when it is further desired to change the display mode depending on a content processing device, one of the devices shown in the device selection region 268 is first selected and then the selection and placement of elemental images and the creation of scenario data are performed as described above. For example, where there are a device that can effect a display of moving image of an elemental image and a device that cannot, the former device is first selected for which to complete an image to be displayed including the moving elemental image, and then the latter device is selected for which to replace the moving elemental image by the stationary elemental image. Also, as will be discussed later, data listing the optimum values of internal parameters dependent on the device are generated.

A description will be given of a processing to be done by the control data generating unit 132 in response to the above-described inputs. Firstly, the image correspondence data generator 134 acquires the elemental image information, such as file names and storage locations, of images selected as elemental images and the placement information on the images and calculates a coordinate transform matrix from the placement information when the user has performed a decision operation after placing the elemental images in the image construction creating region 262. Thus generated are the image correspondence data of a tree structure as shown in FIG. 10 having the respective pieces of information as nodes. At this time, an elemental image for which "Link" is selected in the link setting window 269 is added as a child node of the elemental image to be linked, and an elemental image for which "Non-link" is selected is added as a child node of the route node.

Also, where, as described above, the other elemental images are displayed only when a specific hierarchical level of a hierarchical image is displayed, the elemental image to be added is added as a child node of the node of the hierarchical image. Note, however, that since this elemental image is a "conditional image", its parent node is an image of a certain hierarchical level only. Therefore, added to the conditional image of the image correspondence data are the hierarchical level which is the parent node and the relative position in relation to the image of the hierarchical level as the placement information. At the time of display, the display or non-display of the conditional image is determined by referencing the placement information.

The scenario data generator 136 acquires the viewpoint coordinates set by the user in the scenario data setting mode or the placement information on each elemental image placed within the display region as seen from the viewpoint, and records its temporal change as the scenario data. The scenario data is created using a mark-up language such as XML. A simple example of the scenario data will be shown below.

TABLE 1

| | |
|---|---|
| <?xml version="1.0" encoding="utf-8" ?> | (1) |
| <Viewer> | (2) |
|     <Story autoexec="false" freefly="true"> | (3) |
|         <Section> | (4) |
|             <Event type="image" name="001.jpg" wait="1.13"> | (5) |
|                 <Position x="−0.44" y="−0.60" alpha="1.0" layer="1000" | (6) |
|                    gvdposition="false" scale="1.0 1.0" rotation= "0.0 0.0 1.0 0.0" /> | (7) |
|             </Event> | (8) |
|             <Event type="image" name="002.jpg" wait="1.13"> | (9) |
|                 <Position x="−0.16" y="−0.14" alpha="1.0" layer="1002" | (10) |
|                    gvdposition="true" scale="1.0 1.0" rotation="0.0 0.0 1.0 0.0" /> | (11) |
|             </Event> | (12) |
|         </Section> | (13) |
|     </Story> | (14) |
| </Viewer> | (15) |

That the image of "001.jpg" and the image of "002.jpg" are to be displayed in this order is described in the fifth and ninth lines of the above scenario data in Table 1. In the sixth and tenth lines thereof, the position in which each of the aforementioned images is displayed is described in the display coordinates system. That the image of "001.jpg" is set as "non-linked" and that the image of "002.jpg" is set as "linked" are described as "false" and "true", respectively, in the seventh and eleventh lines thereof. When the user sets the viewpoint coordinates, the scenario data generator 136 references the image correspondence data and then converts the display position of each elemental image in its display region into a display coordinate system so as to describe the converted coordinates in the scenario data such as the above Table 1.

Where the user determines arrangement of elemental images including different elemental images for a plurality of content processing devices, the device-dependent data generator 138 creates data describing the correspondence between the identification information on image correspondence data prepared for the respective devices and the identification information on the devices. This applies also to the scenario data. A table describing an optimum value of internal parameters necessary for the displaying is prepared beforehand for each of the respective content processing devices. Then, the device-dependent data generator 138 creates device-dependent data that describes the information read out from this table according to the user's selection of device.

For example, the following method may be conceivable to reduce a defect of being incapable of keeping pace with the loading and decoding of image data, for instance, due to a very high moving rate of the display region when the display region is shifted in response to the user's viewpoint shift request. That is, the viewpoint shift request signal entered by the user is delayed by a convolution filter and then such a delay is reflected in the movement of the display region. The processing capacity to load or decode the data varies depending on a device used and therefore an optimum convolution kernel also varies depending on the device used then. Thus, an optimum kernel is described in the device-dependent data, based on the device selected by the user.

The internal parameter is not limited to the convolution kernel and may be a parameter whose optimum value changes depending on the performance of the device used. For example, the size of image data loaded into the main memory 60 from the hard disk drive 50, the presence or absence of effect processing performed when the displaying is switched in the mode where the image display is performed based on the scenario data, and so forth may be used as the internal parameter. The arrangement may be such that the internal parameter is set by the user himself/herself. Also, the internal parameter may be a coordinate system which is, for example, one used among a pixel coordinate system, a screen coordinate system, and a normalized coordinate system, depending on the resolution of a display device provided in the content processing device.

Figure 18:
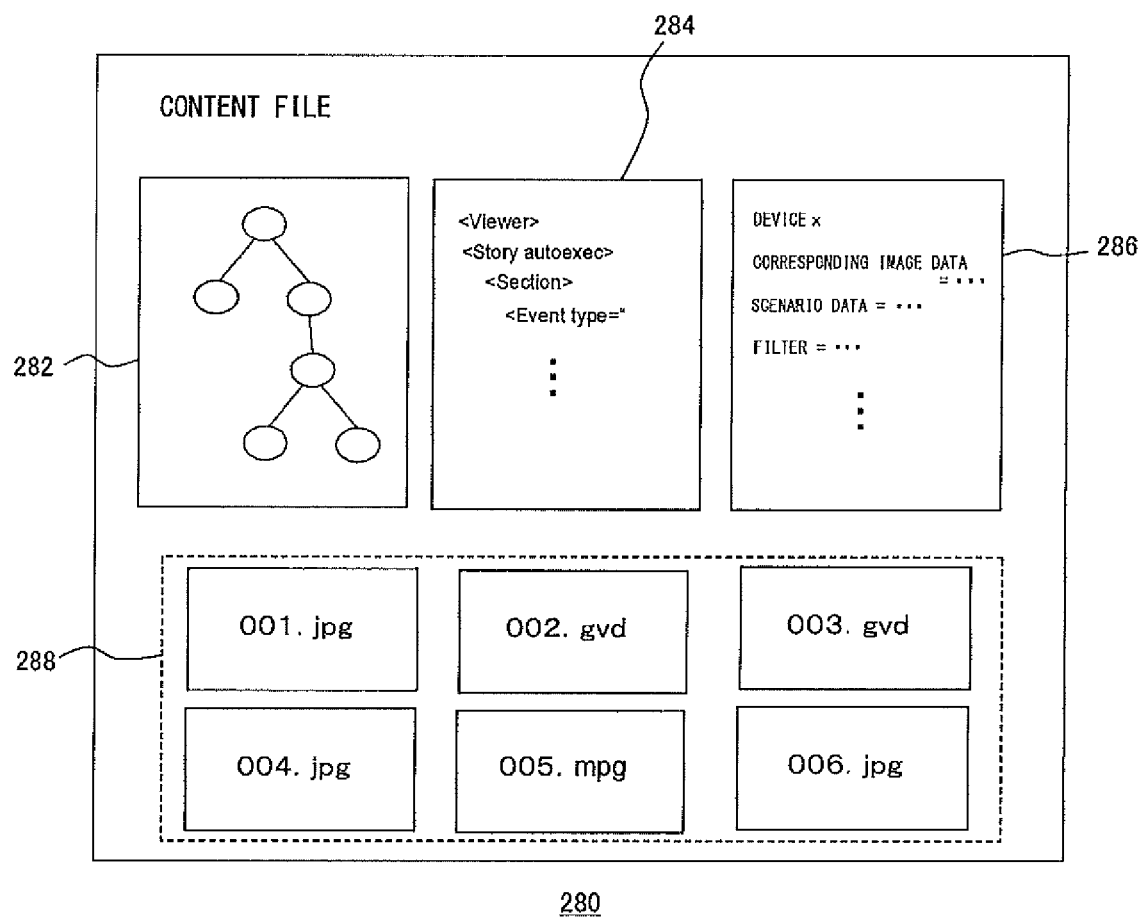
FIG. 18 conceptually shows content of a content file finally generated in an embodiment.

FIG. 18 conceptually shows content of a content file finally generated. The content file generator 140 acquires image correspondence data 282, scenario data 284, and device-dependent data 286 which are generated as above and then associates them with elemental image data 288. If the device-dependent data 286 is generated, a content file may be created for each of the content processing devices. Or data used in all of the content processing devices may be gathered together and combined into a content file, and then the display content and the internal parameter may be determined by referencing the device-dependent data 286, when the processing is performed in any one of the content processing devices.

By employing the embodiments as described above, introduced is the image correspondence data where the relative positions in a plurality of elemental images are set so as to construct a tree structure. In the image correspondence data, the relative position is expressed by a coordinate transform matrix. "Link" or "non-link" between the elemental images is defined by the connection of nodes. By this way, it becomes easy to generate or modify the image data for displaying an image including a plurality of elemental images, such that a part of elemental images is/are moved in synchronism with the movement in the viewpoint, and the other part of elemental images is/are located constantly in the same position. Furthermore, the displaying such an image can be done efficiently.

For example, when the elemental images include a hierarchical image with which the image data used for the displaying is switched, due to a change in the enlargement factor of the displayed image, among a plurality of image data whose resolution differs from each other, the scaling in the coordinates is varied every time the image data used is switched. Thus, it is difficult to define universal relationship with the other elemental images. However, use of the image correspondence data mitigates the processing load during image display. This is because if only the coordinate transform matrix defining the correspondence between a hierarchical image and its parent node is rewritten, the coordinates of the elemental image of a node below it can be converted through the similar calculation in such a manner as to reflect the change in the hierarchical image.

Also, even though such a complex elemental image where the content is varied during the display is used, the creation of content can be made easily. Thus the burden placed on a content creator can be reduced and the range of the examples of application can be broadened. Use of the image correspondence data allows the pasting of another elemental image on a certain hierarchical layer alone in the hierarchical data, for instance. Thus, various types of image expressing means can be easily achieved without editing the elemental image itself.

Further, the scenario data defining the shifts in the viewpoint is realized by the same authoring apparatus as that which prepares the image correspondence data. This facilitates the automatic control of a complex image display as described above. Also, the control data where a content processing device is associated with the optimum internal parameter, an elemental image and the like is included in the content, so that the image displaying can be realized in an optimum environment where both the performance of the device and the content are taken into consideration.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

DESCRIPTION OF THE REFERENCE NUMERALS

1 Information processing system, 10 Information processing apparatus, 12 Display apparatus, 20 Input device, 30 0-th hierarchy, 32 First hierarchal level, 34 Second hierarchal level, 36 Third hierarchal level, 38 Tile image, 44 Display processing unit, 50 Hard disk drive, 60 Main memory, 70 Buffer memory, 100 Control unit, 102 Input information acquiring unit, 104 Viewpoint coordinate acquiring unit, 106 elemental image rendering unit, 108 Coordinate conversion unit, 110 Elemental image integrating unit, 112 Content file, 114 Scenario data, 116 Hierarchy image data, 118 Elemental image data, 120 Image correspondence data, 130 Input information acquiring data, 132 Control data generating unit, 134 Image correspondence data generator, 136 Scenario data generator, 138 Device-dependent data generator, 140 Conte file generator As described above, the present invention is applicable to information processing apparatuses such as a computer, an image processing apparatus, a content preparing apparatus and a game device.

The invention claimed is:

1. An information processing apparatus for processing content and displaying an image comprised of elemental images, the elemental images including hierarchical images having a data structure where pieces of image data with different resolutions generated from the single elemental image are hierarchized according to resolution, the information processing apparatus comprising:

a viewpoint coordinate acquiring unit configured to receive a request for a shift of a viewpoint for the displayed image and configured to acquire viewpoint coordinates of an image to be displayed next based at least in part on a hierarchical coordinate system comprising levels of hierarchical image data representing different resolutions, wherein image data at a particular hierarchical level is decoded according to the position of the viewpoint;

an elemental image rendering unit configured to render the elemental image; and a coordinate conversion unit configured to convert a hierarchical coordinate system unique to each elemental image into a display coordinate system, based on image correspondence data where a layout of the elemental image is expressed by a relative position in relation to another elemental image, and configured to calculate positional coordinates in the display coordinate system of each elemental image corresponding to the viewpoint coordinates of the image to be displayed next; and an elemental image integrating unit configured to generate a displayed image where the elemental image rendered by the elemental image rendering unit is arranged in the respective positional coordinates.

2. An information processing apparatus according to claim 1, wherein the relative position of the image correspondence data is expressed by a coordinate transform matrix used to convert the coordinate system of the elemental image to the coordinate system of the another elemental image, and wherein when a hierarchical level of image data used to display the hierarchical image is switched by a shift of the viewpoint, the coordinate conversion unit modifies the coordinate transform matrix, used to convert the coordinate system of the hierarchical image to the coordinate system of the another elemental image in the image correspondence data and then calculates the respective positional coordinates in the display coordinate system of each elemental image.

3. An information processing apparatus according to claim 1, wherein for the image correspondence image, the layout of the elemental image linked to the another elemental image as a result of the shift of the viewpoint is expressed by the relative position in relation to the another elemental image, and the relative position in relation to a display is set to an elemental image not linked to the another elemental image.

4. An information processing apparatus according to claim 1, wherein the elemental image contains a conditional elemental image of which relative position is defined, in the image correspondence data, in relation to an image in a specified hierarchical level which constitutes a part of the hierarchical image data, and wherein the elemental image integrating unit places the conditional elemental image within the displayed image, only when the hierarchical image is to be displayed using data on the hierarchical level specified for the conditional elemental image.

5. An information processing apparatus according to claim 1, wherein the image correspondence data is such that a display is set as a root node and each elemental image is set to a node other than the root node, and the image correspondence data has a tree structure where elemental images expressing relative positions are associated with each other.

6. An information processing apparatus for supporting the preparation of content displaying an image comprised of elemental images, the elemental images including hierarchical images having a data structure where pieces of image data with different resolutions generated from a single image are hierarchized in the order of resolution, the information processing apparatus comprising:

an input information acquiring unit configured to receive, from a user, elemental image data on the elemental images, a layout of each elemental image, and a designation of an elemental image that moves in conjunction with another elemental image as a result of a shift of a viewpoint when displayed;

a coordinate conversion unit configured to convert a hierarchical coordinate system unique to each elemental image into a display coordinate system, based on image correspondence data where a layout of the elemental image is expressed by a relative position in relation to another elemental image, and calculate positional coordinates in the display coordinate system of each elemental image corresponding to the viewpoint coordinates of the image to be displayed next;

an image correspondence data generator configured to generate image correspondence data where the elemental image data is associated with relative positional information expressing the layout of each elemental image through a relative position of another elemental image that is linked to each elemental image; and a content file generator configured to generate a content file data where the elemental image data and the image correspondence data are associated with each other.

7. An information processing apparatus according to claim 6, wherein, in the image correspondence data, the image correspondence data generator associates the relative positional information with relation to a display with an elemental image not specified to move in conjunction with the another elemental image.

8. An information processing apparatus according to claim 6, wherein the input information acquiring unit further receives from the user a designation of a temporal change in the display region and in the enlargement factor of an image to be realized at the time the content is processed, the information processing apparatus further comprising a scenario data generator that is configured to calculate positional coordinates in a display coordinate system of an elemental image to be displayed, based on the designation of the temporal change and the relative positional information in the image correspondence data, and that is configured to generate scenario data including the display order and the positional coordinates of the elemental image.

9. An information processing apparatus according to claim 6, wherein the input information acquiring unit further receives from the user a designation of a device that is to process the content, the information processing apparatus further comprising a device-dependent data generator configured to generate device-dependent data indicating an optimum value of an internal parameter concerning an image display process, which is used when the content is processed by a device specified by the user, by referencing a pre-prepared table that associates identification information on a device that processes the content with the optimum value of the internal parameter.

10. An information processing apparatus according to claim 6, wherein the input information acquiring unit further receives from the user a designation to replacing the elemental image with another elemental image depending on a device that processes the content, and wherein the image correspondence generator generates image correspondence data for each device that processes the content.

11. An information processing method for processing a content displaying an image comprised of elemental images, the elemental images including hierarchical images having a data structure where pieces of image data with different resolutions generated from a single image are hierarchized in the order of resolution, the method comprising:
  receiving a request for a shift of a viewpoint for the displayed image and acquiring viewpoint coordinates of an image to be displayed next based at least in part on a hierarchical coordinate system comprising levels of hierarchical image data representing different resolutions, wherein image data at a particular hierarchical level is decoded according to the position of the viewpoint;
  reading, from a memory, data of the elemental images and rendering the elemental image; and
  reading, from the memory, image correspondence data where a layout of the elemental image is expressed by a relative position in relation to another elemental image and converting a coordinate system unique to each elemental image into a display coordinate system, based on the image correspondence data, and calculating positional coordinates in the display coordinate system of each elemental image corresponding to the viewpoint coordinates of the image to be displayed next; and
  generating a displayed image where the elemental image rendered is arranged in the positional coordinates, and displaying the displayed image on a display apparatus.

12. An information processing method for supporting the preparation of content displaying an image comprised of elemental images of the displayed image, the elemental images including a hierarchical images having a data structure where pieces of image data with different resolutions generated from a single image is are hierarchized in the order of resolution, the method comprising:
  receiving, from a user, elemental image data on the elemental images, a layout of each elemental image, and a designation of an elemental image that moves in conjunction with another elemental image as a result of a shift of a viewpoint when displayed;
  generating image correspondence data where the elemental image data is associated with relative positional information expressing the layout of each elemental image through a relative position of another elemental image linked to each elemental image, and storing the image correspondence data in a memory;
  converting a hierarchical coordinate system unique to each elemental image into a display coordinate system, based on image correspondence data where a layout of the elemental image is expressed by a relative position in relation to another elemental image;
  calculating positional coordinates in the display coordinate system of each elemental image corresponding to the viewpoint coordinates of the image to be displayed next; and
  generating content file data where the elemental image data and the image correspondence data are associated with each other, and storing the content file in the memory.

13. A program, embedded in a non-transitory computer-readable medium, for processing content displaying an image comprised of elemental images, the elemental images including a hierarchical images having a data structure where pieces of image data with different resolutions generated from a single image is hierarchized in the order of resolution, the program comprising:
  a viewpoint coordinate acquiring module operative to receive a request for a shift of a viewpoint for the displayed image and operative to acquire viewpoint coordinates of an image to be displayed next;
  an elemental image rendering module operative to read, from a memory, data of the elemental images and operative to render the elemental image; and
  a coordinate conversion module operative to read, from the memory, image correspondence data where a layout of the elemental image is expressed by a relative position in relation to another elemental image and converting a coordinate system unique to each elemental image into a display coordinate system, based on the image correspondence data, and operative to calculate positional coordinates in the display coordinate system of each elemental image corresponding to the viewpoint coordinates of the image to be displayed next based at least in part on a hierarchical coordinate system comprising levels of hierarchical image data representing different resolutions, wherein image data at a particular hierarchical level is decoded according to the position of the viewpoint; and
  an elemental image integrating module operative to generate a displayed image where the elemental image rendered is arranged in the respective positional coordinates, and operative to display the displayed image on a display apparatus.

14. A program, embedded in a non-transitory computer-readable medium, for supporting the preparation of content displaying an image comprised of elemental images, the elemental images including hierarchical images having a data structure where pieces of image data with different resolutions generated from a single image are hierarchized in the order of resolution, the program comprising:
  an input information acquiring module operative to receive, from a user, elemental image data on the elemental images, a layout of each elemental image, and a designation of an elemental image that moves in conjunction with another elemental image as a result of a shift of a viewpoint when displayed;
  an image correspondence data generating module operative to generate image correspondence data where the elemental image data is associated with relative positional information expressing the layout of each elemental image by a relative position of another elemental image linked to each elemental image, and operative to store the image correspondence data in a memory;
  a coordinate conversion module configured to convert a hierarchical coordinate system unique to each elemental image into a display coordinate system, based on image correspondence data where a layout of the elemental image is expressed by a relative position in relation to another elemental image, and calculate positional coordinates in the display coordinate system of each elemental image corresponding to the viewpoint coordinates of the image to be displayed next; and
  a content file generating module operative to generate content file data where the elemental image data and the image correspondence data are associated with each other, and operative to store the content file in the memory.

15. A non-transitory computer-readable medium encoded with a program, executable by a computer, for processing content displaying an image comprised of elemental images, the elemental images including hierarchical images having a data structure where pieces of image data with different resolutions generated from a single image are hierarchized in the order of resolution, the medium comprising:

a viewpoint coordinate acquiring module operative to receive a request for a shift of a viewpoint for the displayed image and operative to acquire viewpoint coordinates of an image to be displayed next;

an elemental image rendering module operative to read, from a memory, data of the elemental images and operative to render the elemental image; and a coordinate conversion module operative to read, from the memory, image correspondence data where a layout of the elemental image is expressed by a relative position in relation to another elemental image and operative to convert a coordinate system unique to each elemental image into a display coordinate system, based on the image correspondence data, and operative to calculate positional coordinates in the display coordinate system of each elemental image corresponding to the viewpoint coordinates of the image to be displayed next based at least in part on a hierarchical coordinate system comprising levels of hierarchical image data representing different resolutions, wherein image data at a particular hierarchical level is decoded according to the position of the viewpoint; and an elemental image integrating module operative to generate a displayed image where the elemental image rendered is arranged in the positional coordinates, and operative to display the displayed image on a display apparatus.

16. A non-transitory computer-readable medium encoded with a program, executable by a computer, for supporting the preparation of content displaying an image comprised of elemental images, the elemental images including hierarchical images having a data structure where pieces of image data with different resolutions generated from a single image is are hierarchized in the order of resolution, the medium comprising:

an input information acquiring module operative to receive, from a user, elemental image data on the elemental images, a layout of each elemental image, and a designation of an elemental image that moves in conjunction with another elemental image as a result of a shift of a viewpoint when displayed;

an image correspondence data generating module operative to generate image correspondence data where the elemental image data is associated with relative positional information expressing the layout of each elemental image by a relative position of another elemental image linked to each elemental image, and operative to store the image correspondence data in a memory;

a coordinate conversion module configured to convert a hierarchical coordinate system unique to each elemental image into a display coordinate system, based on image correspondence data where a layout of the elemental image is expressed by a relative position in relation to another elemental image, and calculate positional coordinates in the display coordinate system of each elemental image corresponding to the viewpoint coordinates of the image to be displayed next; and a content file generating module operative to generate content file data where the elemental image data and the image correspondence data are associated with each other, and operative to store the content file in the memory.

17. A non-transitory computer readable medium having stored thereon a data structure of a content for displaying an image comprising:

elemental images, the elemental images including hierarchical images having a data structure where pieces of image data with different resolutions generated from a single image are hierarchized in the order of resolution, wherein the structure of the content file associates data on the elemental images with image correspondence data where a layout of each elemental image at the time of displaying is expressed by a coordinate transform matrix by which a coordinate system unique to the elemental image is converted into that which is unique to another elemental image and positional coordinates in the coordinate system of each elemental image are calculated which correspond to the viewpoint coordinates of the image to be displayed next.

* * * * *